US008694260B1

(12) United States Patent
Jimeno et al.

(10) Patent No.: US 8,694,260 B1
(45) Date of Patent: Apr. 8, 2014

(54) SYSTEM AND METHOD FOR QUALITY CONTROL OF SEISMIC PROJECTS

(76) Inventors: Julio M. Jimeno, Houston, TX (US);
Olga Narvaez, Cypress, TX (US)

( * ) Notice: Subject to any disclaimer, the term of this patent is extended or adjusted under 35 U.S.C. 154(b) by 779 days.

(21) Appl. No.: 12/897,027

(22) Filed: Oct. 4, 2010

Related U.S. Application Data

(60) Provisional application No. 61/300,214, filed on Feb. 1, 2010.

(51) Int. Cl.
*G06Q 99/00* (2006.01)

(52) U.S. Cl.
USPC .................................................. 702/14

(58) Field of Classification Search
USPC .................................................. 702/14
See application file for complete search history.

(56) References Cited

U.S. PATENT DOCUMENTS

| | | | |
|---|---|---|---|
| 4,787,069 A | 11/1988 | Beauducel et al. |
| 5,043,736 A | 8/1991 | Darnell et al. |
| 5,276,655 A | 1/1994 | Rialan et al. |
| 5,497,356 A | 3/1996 | Norton, Jr. et al. |
| 5,920,828 A | 7/1999 | Norris et al. |
| 6,016,462 A | 1/2000 | Schneider, Jr. et al. |
| 6,070,129 A | 5/2000 | Grouffal et al. |
| 6,697,737 B2 | 2/2004 | Jones et al. |
| 6,901,028 B2 | 5/2005 | Clayton et al. |
| 7,149,629 B1 | 12/2006 | Scherzinger et al. |
| 7,222,023 B2 | 5/2007 | Laurent et al. |
| 7,634,598 B2 | 12/2009 | Kim et al. |
| 7,663,973 B2 | 2/2010 | Chamberlain |
| 7,668,657 B2 | 2/2010 | Fenton |
| 2006/0053075 A1 | 3/2006 | Roth et al. |
| 2009/0234585 A1 | 9/2009 | Ross et al. |
| 2010/0039936 A1 | 2/2010 | Jin et al. |

FOREIGN PATENT DOCUMENTS

WO    WO 2008/103225    8/2008

OTHER PUBLICATIONS

David Gibson, Promoting Environmental responsibility in Seismic Operations, Summer 2003, Oilfield Review, p. 10-21.*
Marine Seismic Operations, © IAGC Mar. 2002, 21 pages.*

* cited by examiner

*Primary Examiner* — Tung S Lau
(74) *Attorney, Agent, or Firm* — Kenneth L. Nash

(57) ABSTRACT

A web enabled system for quantitative quality control of seismic projects may comprise at least one server remotely located from the seismic acquisition operation. At least two databases are operated by the server wherein at least one database comprises an electronic map database comprising electronically scalable maps. The server is programmed for receiving data over an Internet connection comprising seismic instrument operation data, contractor data, HSE management system data, and GPS stamped inspection data. A programmable GPS unit is programmed to produce the GPS stamped inspection data and comprises a digital camera operable for recording and storing GPS stamped digital images. The data can be merged into electronically scalable terrain maps to uniquely display tables, graphs, quality indicators, which can be selected at the desired locations for greater depth of information.

6 Claims, 25 Drawing Sheets

| | GENERAL INPUT | | |
|---|---|---|---|
| PRE_PLOT_SPS | * | R01, S01 | UFR_DT_PRE_PLOT_SPS |
| DAILY_REPORT | QAT3373_3D_ | XLSX | UFR_DT_CONTRACTOR_DAILY |
| | GQC MODULE | | |
| POST_PLOT_GQC | * | SP1 | UFR_DT_POST_GQC |
| POST_PLOT_GQC | * | SP1 | UFR_DT_POST_PLOT_GQC |
| | AQC MODULE | | |
| VAPS_RAW | * | WRI | UFR_DT_VAPS_RAW |
| FDU_RAW | *FDU | WRI | UFR_DT_FDU_RAW |
| GEOPHONE_RAW | *GEO | WRI | UFR_DT_PQC_VOID_MISSING |
| | PQC MODULE | | |
| HFVS_CSV | * | CSV | UFR_DT_HFVS_CSV |
| FFID_CSV | * | CSV | UFR_DT_FFID_CSV |
| PQC_VOID_MISSING_FORCES | QC_* | XLSX | UFR_DT_PQC_VOID_MISSING |
| | POST PLOT (AQC/PQC) | | |
| POST_PLOT_AQC | * | S01 | UFR_DT_POST_PLOT_AQC |
| POST_PLOT_AQC | * | R01 | UFR_DT_POST_PLOT_AQC |
| | HSE MODULE | | |
| GEO_INSPECTION_SHAPEFILE | * | SHP | UFR_DT_GEO_INSP_SHP |
| GEO_INSPECTION_SHAPEFILE | * | DBF,SBN,SBX | UFR_DT_GEO_INSP_AUX |
| HSE_CAMP_SHAPEFILE | * | DBF,SBN,SBX | UFR_DT_HSE_CAMP_AUX |
| HSE_CAMP_SHAPEFILE | * | SHP | UFR_DT_HSE_CAMP_SHP |
| HSE_CONTRACTOR_DATA | HSE* | XLSX | UFR_DT_HSE_CONTRACTOR |
| | DAILY REPORTING SYSTEM | | |
| HSE_DAILY_SUMMARY_REPORT | HSE_DAILY_J | XLSX,PDF | UFR_DT_HSE_DLY_SMRY |
| GQC_DAILY_SUMMARY_REPORT | GQC_DAILY_J | XLSX,PDF | UFR_DT_GQC_DLY_SMRY |
| AQC_DAILY_SUMMARY_REPORT | AQC_DAILY_J | XLSX,PDF | UFR_DT_AQC_DLY_SMRY |
| PQC_DAILY_SUMMARY_REPORT | PQC_DAILY_J | XLSX,PDF | UFR_DT_PQC_DLY_SMRY |
| FS_DAILY_SUMMARY_REPORT | FS_DAILY_JEI | XLSX,PDF | UFR_DT_FS_DLY_SMRY |
| | WEEKLY REPORTING SYSTEM | | |
| HSE_WEEKLY_SUMMARY_REPORT | HSE_WEEKLY | XLSX | UFR_DT_HSE_WKLY_SMRY |

FIG. 4

|   | A | B | C | D | E | F | G | H | I | J |
|---|---|---|---|---|---|---|---|---|---|---|
| 1 | CLIENT LOGO | | | | | | | | | |
| 2 | | | | | | | | | | |
| 3 | | | | | PROJECT - 3D | | | | | |
| 4 | CONTRACTOR | COMPANY | | | GEODETIC QC DAILY REPORT | | | CLIENT | | CLIENT COMPANY |
| 5 | TYPE | VIB/DYNAMITE/TZ | | | DATE | | | JEI CONTRACT | | |
| 6 | | | | GEODETIC PARAMETERS | | | | | | |
| 7 | INTERNATIONAL ELLIPSOID | | | PROJECTION: TRANSVERSE MERCATOR | | | | DATUM SHIFT S WGS84 TO QND95 | | |
| 8 | SEMI MAJOR AXIS: XXXXXXX | | | LAT. ORIGIN: XX°XX'XX"N | FALSE EASTING: XXXXX | | | DELTA X | XXX.XXX | RX | -X.XXXXX |
| 9 | SEMIMINOR AXIS: XXXXXX | | | CENT. MERI.: XX°XX'XX"E | FALSE NORTH: | XXXXX | | DELTA Y | XXX.XXX | RY | -X.XXXXX |
| 10 | INVERSE FLATTENING XX.XX | | | SCALE FACTOR: X.XXXXX | | | | DELTA Z | XX.XXXX | RZ | -X.XXXXX |
| 11 | | | | PROJECT 3D - SURVEY PROGRAM | | | | | | |
| 12 | | | | ZIPPER STATISTICS | | | | | | |
| 13 | | | ZIPPER-1 | ZIPPER-2 | ZIPPER-3 | ZIPPER-4 | ZIPPER-5 | ZIPPER-6 | ZIPPER-7 | ZIPPER-8 |
| 14 | RECEIVER LOCATIONS | | XXX,XXX | XXX,XXX | XXX,XXX | XXX,XXX | XX,XXX | XXX,XXX | XX,XXX | 0 |
| 15 | SOURCE LOCATIONS | | 255,562 | 276,554 | 218,421 | 265,445 | 136,719 | 301,973 | 122,264 | 44,926 |
| 16 | SOURCE RECORDS | | 255,562 | 276,554 | 218,421 | 278,953 | 410,157 | 1,092,570 | 382,444 | 44,926 |
| 17 | | TOT. REC. LOCATIONS | | 958,760 | | | TOT. CHARGEABLE VPS | | 1,621,864 | |
| 18 | | SURFACE (KM2) | | 859,000 | | | TOTAL VPS W/ ZIPPER DESIGN | | 2,959,587 | |
| 19 | | | | | SURVEY RECEIVER | | | | | |
| 20 | | | ZIPPER-1 | ZIPPER-2 | ZIPPER-3 | ZIPPER-4 | ZIPPER-5 | ZIPPER-6 | ZIPPER-7 | ZIPPER-8 |
| 21 | DAILY | | 0 | 0 | 2,430 | 330 | 0 | 0 | 0 | 0 |
| 22 | WEEKLY | | 0 | 0 | 4,211 | 820 | 0 | 0 | 0 | 0 |
| 23 | MONTHLY | | 0 | 0 | 14,352 | 55,732 | 0 | 0 | 0 | 0 |
| 24 | YEARLY | | 175,264 | 131,455 | 14,352 | 229,943 | 0 | 0 | 0 | 0 |
| 25 | TOTAL | | 184,320 | 131,455 | 14,352 | 229,943 | 0 | 0 | 0 | 0 |
| 26 | COMPL. % | | 99.96% | 99.95% | 5.66% | 170.74% | 0.00% | 0.00% | 0.00% | 0.00% |
| 27 | | | | | SURVEY SOURCE | | | | | |
| 28 | | | ZIPPER-1 | ZIPPER-2 | ZIPPER-3 | ZIPPER-4 | ZIPPER-5 | ZIPPER-6 | ZIPPER-7 | ZIPPER-8 | PROJECT |
| 29 | DAILY | | 0 | 0 | 0 | 436 | 0 | 0 | 0 | 0 | 2,760 |
| 30 | WEEKLY | | 0 | 0 | 0 | 2,123 | 0 | 0 | 0 | 0 | 5,031 |
| 31 | MONTHLY | | 0 | 0 | 0 | 16,877 | 0 | 0 | 0 | 0 | 70,084 |
| 32 | YEARLY | | 78,991 | 24,279 | 0 | 55,212 | 0 | 0 | 0 | 0 | 551,014 |
| 33 | TOTAL | | 78,991 | 24,279 | 0 | 55,212 | 0 | 0 | 0 | 0 | 560,070 |
| 34 | COMPL. % | | 30.91% | 8.78% | 0.00% | 20.80% | 0.00% | 0.00% | 0.00% | 0.00% | 58.42% |
| 35 | | | | | POSITIONING SOURCE | | | | | |
| 36 | | | ZIPPER-1 | ZIPPER-2 | ZIPPER-3 | ZIPPER-4 | ZIPPER-5 | ZIPPER-6 | ZIPPER-7 | ZIPPER-8 | PROJECT |
| | DAILY | | | | | | | | | | 436 |
| | WEEKLY | | | | | | | | | | 2,123 |
| | MONTHLY | | | | | | | | | | 16,877 |
| | YEARLY | | | | | | | | | | 158,482 |
| | TOTAL | | | | | | | | | | 158,482 |
| | COMPL. % | | | | | | | | | | 9.77% |

| DATA GATHER | HSE | GEODETICS | AQUISITION | ADMIN | HELP |
|---|---|---|---|---|---|

PROJECT PROJECT
ZIPPER ZIPPER
DATE DATE

WELCOME, USER
LOG OUT
EDIT PROFILE
VERSION 1.0

ACQUISITION QC DAILY REPORTS

QUALITY INDICATORS

| QUALITY INDICATORS | 1 | 2 | 3 | 4 | 5 | 6 | 7 | 8 | 9 | 10 | 11 | 12 | 13 | 14 |
|---|---|---|---|---|---|---|---|---|---|---|---|---|---|---|
| AVG PHASE <2° | 2.1 | 2.2 | 2.4 | 1.7 | 1.7 | 0 | 1.5 | 1.7 | 1.2 | 1.0 | 1.3 | 1.0 | 1.2 | 1.4 |
| AVG DISTORTION <20% | 24.0 | 27.4 | 24.7 | 23.4 | 21.5 | 0 | 17.1 | 18.9 | 15.0 | 8.5 | 13.6 | 8.5 | 8.6 | 10.2 |
| AVG FORCE >58% | 66.4 | 67.2 | 66.1 | 66.9 | 67.7 | 98.7 | 63.7 | 67.3 | 63.2 | 56.0 | 58.7 | 68.2 | 69.4 | 56.3 |

| VIBRATOR TEST TYPE | FLT A | FLT B | FLT C | AVG | KPI |
|---|---|---|---|---|---|
| AVG PHASE <2° | 2.0 | 1.1 | 1.2 | 1.4 | 0 |
| AVG DISTORTION <20% | 24.2 | 11.9 | 0.7 | 15.3 | 0 |
| AVG FORCE >58% | 66.9 | 69.8 | 69.3 | 66.6 | 0 |

FIG. 15

HSE MATRIX

| | CREW & COUNTRY MGMT | BASE & MOBILI- ZATION | PERMITS | SURVEY | DRILLING | RECORD- ING | ENVIRO- MENT | ADMIN | SOCIAL ACTION |
|---|---|---|---|---|---|---|---|---|---|
| AVERAGE | 3.36 | 3.40 | 3.39 | 3.84 | 3.43 | 3.31 | 3.41 | 3.45 | 3.75 |
| 1.1. LEADERSHIP & COMMITMENT | | | | | | | | | |
| 1.1.1 VERIFYING STAFF & MGMT COMMITMENT | | | | | | | | | |
| NO. AUDITS BY DEPT. MANAGER | 1 | 4 | 4 | 4 | 4 | 4 | 4 | 4 | 4 |
| NO. HSE MEETINGS | 2 | 4 | 4 | 4 | 4 | 4 | 4 | 4 | 4 |
| NO. INSPECTIONS | 4 | 4 | 4 | 4 | 4 | 4 | 4 | 4 | 4 |
| NO. MANAGERS HSE TRAINED | 4 | 4 | 4 | 4 | 4 | 4 | 4 | 4 | 4 |
| NO. VISITS TO FIELD GROUPS | 4 | 4 | 4 | 4 | 4 | 4 | 4 | 4 | 4 |

FIG. 19

SYSTEM AND METHOD FOR QUALITY CONTROL OF SEISMIC PROJECTS

This application claims benefit of U.S. Provisional Application No. 61/300,214, filed Feb. 1, 2010.

BACKGROUND OF THE INVENTION

1. Field of the Invention

The present invention relates generally to the seismic data acquisition process and, more particularly, to a system for quality control oversight of at least the acquisition, geodetic, processing and HSE (health, safety, environment) portions of the seismic projects.

2. Description of the Background

Due the complexity and typically remote logistics of seismic operations, the quality control (QC) industry for seismic projects has long faced problems that prevent total and effective quality control. Seismic operations tend to involve many differently skilled people, complex equipment, and long distance logistical problems in projects intended to produce extensive electronic measurements, which normally require a considerable period of time and are often performed at highly remote locations.

The QC personnel who monitor the seismic operations are therefore often remotely based, making consistent evaluation of their actual productivity quite difficult. QC personnel have varying levels of experience that can lead to ineffective field practices. Quality report generation takes considerable time and can result in the choice to either reduce the inspection time or produce poor or less complete reports. Lack of uniform procedures can result in less reliable data and a greater chance for errors. Lack of consistent reports leads to less effective management.

The following patents show prior art efforts toward solving the above problems.

U.S. Pat. No. 5,920,828 issued Jul. 6, 1999, to Norris, et al, discloses an automated quality control system for processing geophysical seismic data and positioning data from a marine navigation system. The invention includes a prospect data logger in communication with system components for accessing the seismic data, for coordinating seismic data processing, and for identifying and storing attribute data relevant to the seismic data and the positioning data. The prospect data logger is capable of storing data in a programmed format, and can be engaged with a display for illustrating data accessible to the prospect data logger. The prospect data logger is capable of automatically performing quality control functions such as checking seismic data and positioning data, of verifying the format of merged seismic and positioning data, of generating a command for indicating an event or for controlling another system component. The prospect data logger can verify storage tape quality immediately after data is inputted, and a record of events can be generated. Raw seismic data and positioning data is contemporaneously merged, the merged data can be monitored on a real-time basis, and data processing and quality control can be performed from remote terminals. The system uniquely provides real-time quality control operations sufficient to variables and events so that immediate system corrections can be made.

U.S. Patent Publication No. 2009/0234585, published Sep. 17, 2009, to Ross et al, discloses a system and method for using satellite communications satellites to control and receive data from a land cableless seismic system. The satellite transmission could transmit control signals (e.g. turn on/off) and receive signals from the remote seismograph units (seismic data, quality control parameters, status, location, etc.) which would subsequently be retransmitted to a processing center or other surface facility.

U.S. Patent Publication No. 2010/0039936, published Feb. 18, 2010, to Jin et al, discloses systems and methods for quality of service control over multiple accesses, more particularly quality of service control over multiple accesses via enhanced quality of service rules. A policy rules and charging function, or similar network entity, can include an indicator in a set of quality of service rules that instructs an access gateway to either setup the quality of service resources/initiate bearer setup immediately, or store the quality of service rules until a request for the quality of service resources is received.

U.S. Pat. No. 6,697,737, issued Feb. 24, 2004, to Jones et al, discloses attributes of a seismic data set that are indicative of the quality of the seismic data are displayed in a quality control (QC) hypercube. The axes of the hypercube may be the source position, the source line, the receiver position and a processing step. In a pre-migration QC cube, two of the three axes of the cube are defined by the locations of seismic data. In a migrated QC cube, two of the three axes are defined by the migrated output bin position of processed seismic data. The third axis of the cube contains information about the quality of the data. The QC attributes may be simple amplitudes, or they may be attributes derived from the amplitudes of the seismic data, such as RMS values and/or spectral values. In a migrated QC cube, the attributes may include seismic velocity, seismic fold and distribution of source-receiver azimuths.

U.S. Pat. No. 5,276,655, issued Jan. 4, 1994, to Rialan et al, discloses a method for the automatic association, with seismic signals received by receivers (R1 ... Rn) distributed on a site to be explored, of topographic data relative to the location of these receivers. The seismic signals are collected and stored by seismic acquisition devices (B1-Bn) which, after each seismic "shooting", transmit the signals successively to a central station. When the receivers are positioned in the field, each receiver is located by means of radiopositioning of the GPS type for example, and the position indications are introduced into an auxiliary memory of the corresponding acquisition device. After each repatriation of the data of a shooting, the indications are read in this memory and remain associated with those data at the time of the general grouping on the tape recorder of the central station.

U.S. Pat. No. 5,043,736, issued Aug. 27, 1991, to Darnell et al, discloses a portable locating unit useful both as a cellular telephone and portable global positioning system that provides latitude and longitude information remotely to a base unit display. The system includes a small hand held receiver that receives signals from a satellite global positioning system and timing and computing circuits to provide location information signals. The hand held unit also includes a modem and transmitter to a cellular telephone network which is connected to the base unit computational system and display. The location of an individual or object can thus be determined at the remote station through the use of the cellular telephone network.

U.S. Pat. No. 5,497,356, issued Mar. 5, 1996, to Norton, Jr. et al, discloses one or more slave acoustic transponders that are secured to selected parts of a seismic bottom cable, whose location is imperfectly known. A master transponder broadcasts an interrogation pulse from each of a number of different, known locations distributed along a line of survey. In response to an interrogation pulse, a slave transponder emits an encoded signal that is received by the master transponder. The acoustic flight time between each pulse broadcast and encoded-signal reception constitutes a range measurement to the participating slave transponder.

U.S. Pat. No. 7,634,598, issued Dec. 15, 2009, to Kim et al discloses a dynamic system and method for managing facility services that utilize scheduled predefined events and/or unscheduled variable events, are discussed. The dynamic system can include one or more servers, mobile devices, imaging devices, etc. designed and programmed to receive, manage, control, and/or report events from designated users. The dynamic system effectively manages the flow of work, efficiency of work and quality of work, and provides a common platform for communications within organizations, with their customers, and suppliers.

U.S. Patent Publication No. 2006/0053075, published Mar. 9, 2006, to Roth et al, discloses a system for authorizing access to an asset including a user interface for presenting to a user a checklist of items, a data acquisition device capable of receiving user responses to the checklist of items, and a processor connected to the data acquisition device selectively evaluating user responses to the items and preventing the user from accessing the asset if the user responses to the checklist of items are not satisfactory.

U.S. Pat. No. 4,787,069, issued Nov. 22, 1988, to Beauducel et al, discloses a two stage, decentralized device for transmitting seismic data information from seismic receivers of a seismic streamer to a central recorder on a ship, including a series of interconnected sections each having a plurality of seismic receivers distributed over it's length, seismic signal acquisition apparatus for digitizing and storing seismic signals coming from a group of seismic receivers to which a respective seismic signal acquisition apparatus is connected, central control and recording device on the ship and assembly of electronic modules each disposed in the vicinity of a seismic receiver and being capable of amplifying and filtering the seismic receiver signals.

U.S. Pat. No. 6,901,028, issued May 31, 2005, to Clayton et al, discloses a graphical user interface (GUI) and control system for marine seismic data acquisition along with a method of real-time quality control of the seismic survey. The control system includes real-time data processing of individual source near-field measured signals and concurrent synthesis of array far-field signatures. The control system determines individual source out-of-specification conditions and computes far-field signatures based on an array configuration excluding the failed source. Source, array, and troubleshooting information are presented to a user in real-time over a GUI monitor to allow informed decision-making regarding continued and/or modified survey operations and operational parameters.

U.S. Pat. No. 7,222,023, issued May 22, 2007, to Laurent et al, discloses a method of processing seismic data that comprises identifying the value of a first parameter associated with an event in a first set of seismic data. The value of a second parameter associated with a corresponding event in a second set of seismic data is then obtained using at least one look-up table. The first parameter may be PP travel time with the first data set being a raw PP data set, and the second parameter may be PS travel time with the second data set being a raw PS data set or reflection depth. The invention makes it possible to identify pairs of corresponding PP and PS events in raw data traces. The look-up table(s) are obtained using an assumed model for the velocity of propagation of acoustic energy within the earth. The results of the method may be used in quality control, or to correct the velocity model.

U.S. Pat. No. 6,016,462, issued Jan. 18, 2000, to Schneider, Jr. et al, discloses computer-implemented methods of processing seismic data that are subjected to quantitative evaluation by a computerized testing procedure. The effect of the data processing software under evaluation on attributes of the seismic data is measured and statistically evaluated. The effect of various user-selectable processing parameters of the software under evaluation is also measured and statistically evaluated. To evaluate the software effect on attributes, an attribute of known content represented by seismic data is selected. The seismic data represented by that attribute is processed by the processing software under evaluation. A test measure of the attribute is recomputed as indicated by the results of the processing. A quantitative statistical analysis of the similarities of the two attributes is then performed. For quality control of parameter estimates, a parameter-sweep test is performed on original data containing known events. An attribute is computed for both the original data and the parameter-sweep test results. Again, quantitative statistical measures of the similarities between the attributes are formed for evaluation purposes.

U.S. Pat. No. 6,070,129, issued May 30, 2000, to Grouffal et al, discloses transmission to a remote station, by means of transmission channels (generally radio transmission channels), of seismic data acquired by a data collection equipment comprising a plurality of acquisition units, each being suited to acquire, to store and preferably to compress the data to be transmitted. The invention comprises ordered storage, in a high-capacity memory (flash type memory for example) of each acquisition unit (Ai), of data obtained during successive emission-reception cycles (acquired and possibly preprocessed seismic data) so as to form a stream of stored data to be transmitted, and progressive transfer of the stored data stream from each acquisition unit to the remote station by means of the transmission channel, by reading each storage memory, with a time lag in relation to the time of their storage depending on the transmission rate of each transmission channel and on the transmission mode selected with preferably, if sending of the data of a cycle is delayed, sending of at least partial data, compressed or not, for quality control purposes. The data transmitted are reconstituted at the remote station. The method can be used for large-scale seismic data transmission.

U.S. Pat. No. 7,149,629, issued Dec. 12, 2006, to Scherzinger et al, discloses a land surveyor system with reprocessing is carried by a surveyor moving from a first known position at the start of a survey interval to a second known position at the end of the survey interval has an AINS (aided inertial navigation system) that provides a continuing sequence of time-indexed present position values. A position computing system uses a program that stores the sequence of time-indexed present position values in a memory. A reprocessing computer and program is activated at the second known position to access and process the continuing sequence of time-indexed present position values with a smoothing program to provide indexed and adjusted present position values for at least some of the time-indexed present position values. The system is packaged for transport and use by a surveyor. A switch permits the surveyor to signal that the unit is stationary.

U.S. Pat. No. 7,663,973, issued Feb. 16, 2010, to Chamberlain, discloses a seismic survey system having remote acquisition modules (RAMs) for acquiring seismic signals and communicating with a central recording system (CRU) via a network of cables, other RAMs, and line tap units (LTUs), arranged in a matrix of receiver lines and base lines. Each RAM cyclically converts analog signal values to digital, forming data packets. Interrogation commands emanating from the CRU and relayed with strategic delays by intervening LTUs and RAMs are received by the RAM. Each command causes the RAM to transmit a data packet. Strategic delays are set such that the transmission capacity of the line is best utilized. Power and frequency of transmission are selectable by the CRU to optimize performance. Cables contain multiple communication pairs. The network path between the RAM and the CRU is established from the CRU and altered in event of malfunction. All types of network elements are inter-connectable. Recorded samples are synchronous.

U.S. Pat. No. 7,668,657, issued Feb. 23, 2010, to Fenton, discloses a system for determining positions of fixed-position GPS receivers that have restricted views of the sky. The system includes a data recording and control center, and one or more base GPS receivers with associated antennas with a substantially unrestricted views of the sky. The system batch processes range information provided by the fixed-position GPS receivers over an extended period of time; determining which of the range data from the fixed-position receivers are valid, and using the valid range data to determine position. In this way, the precise positions of the respective fixed-position slave GPS receivers can be calculated, even if the fixed-position GPS receivers are able to observe and collect data from sets of two or more satellites for only three or four relatively short time intervals at various sky positions during the extended period.

International patent publication WO 2008/103225, published Aug. 28, 2008, to Trig-Point Solutions LLC, discloses an asset tracking and maintenance scheduling and verification system for coordinating preventative or periodic maintenance activities for a collection of assets. A system server is responsible for maintenance of an asset database including a database record for each asset identifying tracking and maintenance information for the asset. The system server generates task lists for assets based at least in part upon data stored in the database. One or more remote handheld devices are in selective communication with the system server to receive the task lists, whereupon a user in possession of a handheld device is directed to perform a series of tasks on one or more assets. In the course of performing such tasks, a user inputs task-related information that is subsequently uploaded to the system server and incorporated into the database, such that subsequent task lists generated by the system server will reflect previous performance tasks.

The above cited art does not provide solutions to the above listed problems. Those skilled in the art have long sought and will appreciate the present invention that addresses these and other problems.

SUMMARY OF THE INVENTION

It is an object of the present invention to provide an improved system for quality control of the seismic data acquisition process.

It is another object of the present invention to provide field QC personnel and supervisors the ability to validate acquired data daily throughout the life of the project.

It is yet another object of the present invention to provide a summary dashboard to review real-time data and key performance indicators for more informed management decisions by the client.

The controlling software for all or most of the various functions may preferably be provided in a database server behind a firewall. The software may preferably offer the ability to provide quality control for many projects, and for individual contracts within each project, and for individual phases within each contract.

These and other objects, features, and advantages of the present invention will become apparent from the drawings, the descriptions given herein, and the appended claims. However, it will be understood that the above-listed objectives and/or advantages of the invention are intended only as an aid in quickly understanding aspects of the invention, are not intended to limit the invention in any way, and therefore do not form a comprehensive or restrictive list of objectives, and/or features, and/or advantages.

Accordingly, the present invention provides a system for quantitative quality control for seismic acquisition operations. In one embodiment, the system may comprise at least one server remotely located from the seismic acquisition operation. At least two databases may be operated by the server wherein one database comprises a map database comprising electronically scalable maps. The server is programmed for receiving at least three types of data over an Internet connection comprising seismic instrument operation data, contractor data, GPS stamped inspection data, and health, safety, environment (HSE) data. HSE data may also comprise security data.

A programmable GPS unit is operable to produce the GPS stamped inspection data and programmed to produce and output inspection scores. The programmable GPS unit may comprise a digital camera operable for recording and storing GPS stamped digital images.

The server may be programmed to utilize a first set of configurable quantitative quality performance indicators for a seismic survey and layout phase of the seismic acquisition operation wherein the first set of quantitative quality performance indicators are produced by at least comparing pre-plot data of sources and receivers and actual daily results from the contractor data as verified with the GPS stamped inspection data. The first set of quantitative performance indicators are produced when the actual daily results are compared to a plurality of ranges of respective quantitative performance configurable tolerances.

The server may be being programmed to utilize a second set of configurable quantitative quality performance indicators for a seismic signal recording phase of the seismic acquisition operation wherein the second set of quantitative quality performance indicators are produced by at least comparing instrument operation test results for a plurality of seismic instruments to respective configurable quantitative performance tolerances.

The server may be programmed to merge and display source and receiver lines on an electronically scalable terrain map with indicators along the shot lines, wherein when the indicators are selected, then GPS location indexed digital images of quality problems along the source and receiver lines are displayed.

The server may be programmed to utilize a third set of configurable quantitative quality performance indicators related to at least one of health, safety, and environment (HSE) for the seismic acquisition operation wherein the third set of configurable quantitative quality performance indictors are produced in response to a matrix of inspection related scores.

The server may be programmed for selectively producing a plurality of alarms based on a range of values for the inspection related scores indicators for individual cells of the matrix, and for ranges of values of the third set of quantitative quality performance indicators, which are produced for the rows and columns of the matrix.

The server may be programmed for selectively producing a plurality of alarms based on a frequency of the values for the inspection related scores indicators for individual cells of the matrix are inspected. In one embodiment, the plurality of alarms are associated with a hierarchal notification list.

The server may be programmed to produce a segmented display with color coded segments wherein colors indicate ranges of quantitative quality performance for the matrix, and whereby the color coded segments of the display that indicate potential incidents can be selected to display detailed information for the potential incidents. For example, the color coded segments may correspond to cells of the matrix and produce data from the matrix when selected. The data from the matrix may be further detailed with additional selections. The matrix may be organized into columns and rows corresponding to departments and elements, chapters, and units.

The server may be programmed to display reforestation data wherein the reforestation data comprises inspection input data from the GPS photographic unit, which comprises GPS position designated photographs of replacement of vegetation. This photographic data and other data may be shown by indicators at positions of an electronically scalable terrain map wherein the indicators can be selected to view the photographs to provide quality control evidence of the reforestation.

The server may be programmed to utilize a fourth set of quantitative quality performance indicators for a field processing phase of the seismic acquisition operation wherein the fourth set of quantitative quality performance indicators are produced.

In another embodiment, a quantitative quality control module for health, safety, and environment (HSE) for a seismic project may comprise a processor programmed for receiving data over an Internet connection wherein the data may comprise at least contractor data and GPS stamped inspection data from a programmable GPS unit capable of recording digital images which is programmed to provide input for populating a matrix of inspection related scores.

The processor may be programmed to populate the matrix and utilize a set of configurable quantitative quality performance indicators related to the health, safety, and environment (HSE) for the seismic project wherein the set of configurable quantitative quality performance indicators is produced in response to the matrix of inspection related scores.

In yet another embodiment, the system may comprise a programmable GPS unit which is capable of recording digital images and which is programmed to receive and organize inspection input data over time to produce GPS stamped inspection output data. The programmable GPS unit is programmed to send the inspection output data over an Internet connection. The processor is programmed to utilize a first set of configurable quantitative quality performance indicators for a seismic survey and layout phase of the seismic project wherein the first set of quantitative quality performance indicators are produced by comparing pre-plot data of sources and receivers and actual daily results from the contractor data as verified with inspection output data and wherein the first set of quantitative performance indicators are produced when the actual daily results are compared to a plurality of ranges of respective quantitative performance configurable tolerances.

BRIEF DESCRIPTION OF THE DRAWINGS

FIG. 4 is a partial listing of data input files for the system of FIG. 1 in accord with one possible embodiment of the present invention;

FIG. 10 is a report which may be automatically produced utilizing data uploaded by the geodetics QC module of FIG. 5, which shows progress of the seismic project in terms of the number of receiver locations, source locations, and source records produced within various time periods in accord with one possible embodiment of the present invention;

FIG. 15 is a report which may be automatically produced by the acquisition QC module of FIG. 12 in response to data uploaded during use of the module, which may show various QC parameters which affect the quality of the acquired seismic signals in accord with one possible embodiment of the present invention;

FIG. 19 is a display of a selected portion of a scoring matrix for an HSE QC module in accord with one possible embodiment of the present invention;

While the present invention will be described in connection with presently preferred embodiments, it will be understood that it is not intended to limit the invention to those embodiments. On the contrary, it is intended to cover all alternatives, modifications, and equivalents included within the spirit of the invention and as defined in the appended claims.

DETAILED DESCRIPTION OF THE PREFERRED EMBODIMENTS

Figure 1:
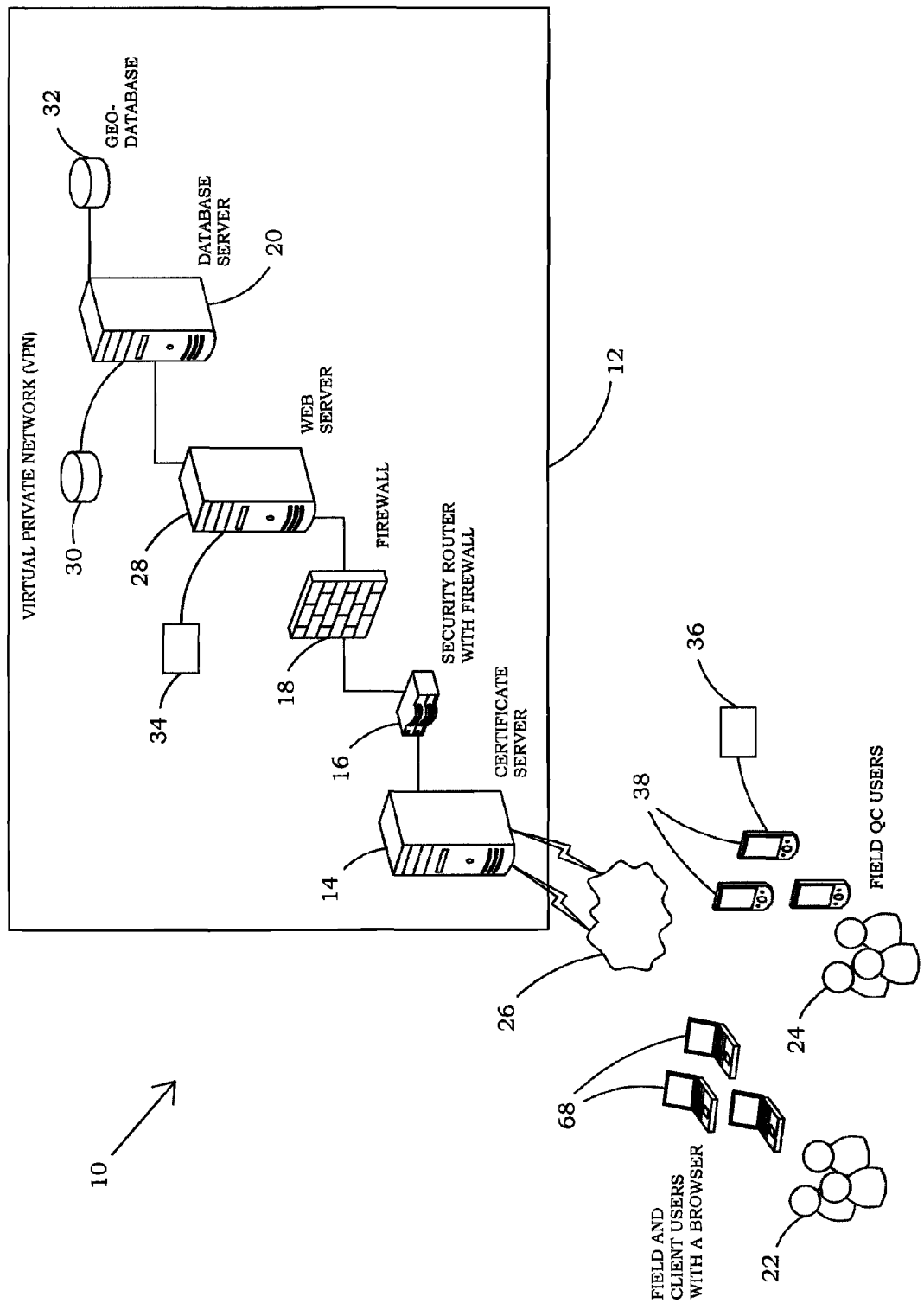
FIG. 1 is a schematic which shows a hardware architecture for a system to effect quantitative quality control of multiple seismic projects in accord with one possible embodiment of the present invention.
Figure 3:
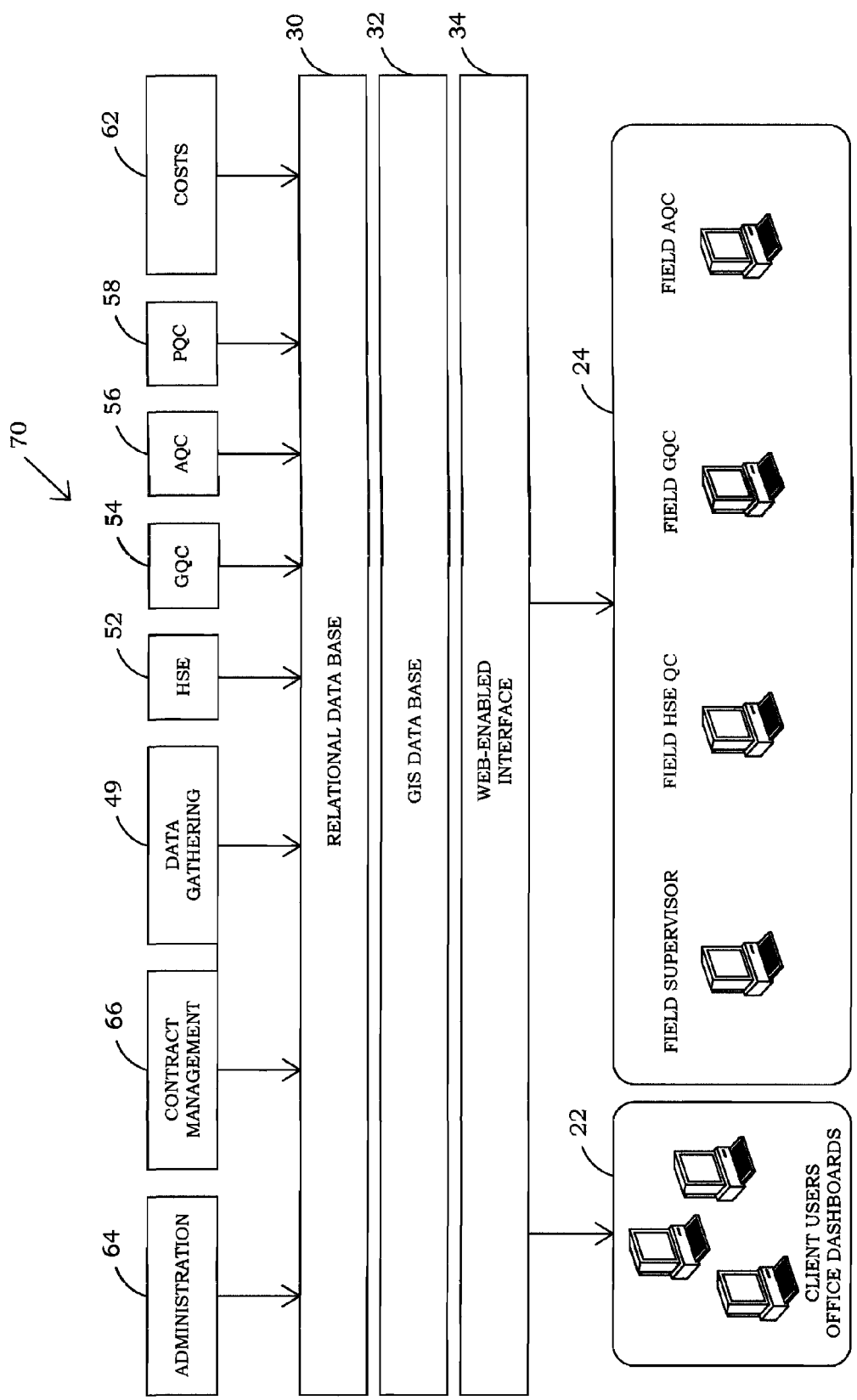
FIG. 3 is a diagram that shows a software modules overview for the system of FIG. 1 in accord with one possible embodiment of the present invention.

Referring now to the drawings and, more particularly, to FIG. 1, there is shown an overview of one possible embodiment of QC system hardware architecture 10, which may be utilized for quantitative quality control of many widespread seismic acquisition operations simultaneously. Referring also to FIG. 3, there is shown an overview of corresponding QC system software modules 70.

In this embodiment, QC system hardware 10 comprises secure virtual private network 12, which is utilized by clients and quality control personnel to send, receive and archive QC data via Internet computer network 26, safely and securely. Certificate server 14 is utilized to issue certificates, which verify the identity of users of the system. SSL virtual private network router 16, which comprises a firewall, is provided for security access. Extra firewall 18 provides additional protection of data.

In this embodiment, database server 20 contains two databases. Relational database 30 holds QC rules and configuration tables and, in this example, may utilize SQL server 2008 technology. Geographical database 32 may utilize ARCGIS v 9.3.2 to hold electronically scalable maps, which in accord with the present invention are utilized to produce QC maps merged or populated with QC data, contractor data, and the like, which are individualized for any number of seismic projects as discussed hereinafter.

Web server 28, is utilized to hold web server application 34, which may comprise ASPX pages written in C# .NET programming language. The pages of web server application 34 may be utilized by users 22 and 24 as graphical user interfaces to display the data coming from relational database 30 and geographical database 32 for the seismic acquisition project phase related modules shown in FIG. 2. Web server 28 and database server 20 may preferably comprise additional redundancy servers. Web server 28 and database server 20 may typically be located at any distance from data gathering of the seismic project, e.g., remotely located hundreds or thousands of miles away.

Again referring to FIG. 1, programmable GPS units 38 utilize mobile application 36, which may be created using ArcPad v8.0 language. Programmable GPS units 38 are utilized by QC personnel to capture the various types of field data including photographs with GPS data stamped to the field data. Computers with a browser, such as computers 68, may connect to application 34. Users 22 and 24, which may comprise clients and QC personnel, are authenticated utilizing secure virtual private network 12 by certificate server 14 and SSL virtual private network router 16. This certificate type of security also applies to programmable GPS units 38, which in addition utilize user authentication for QC personnel.

Figure 2:
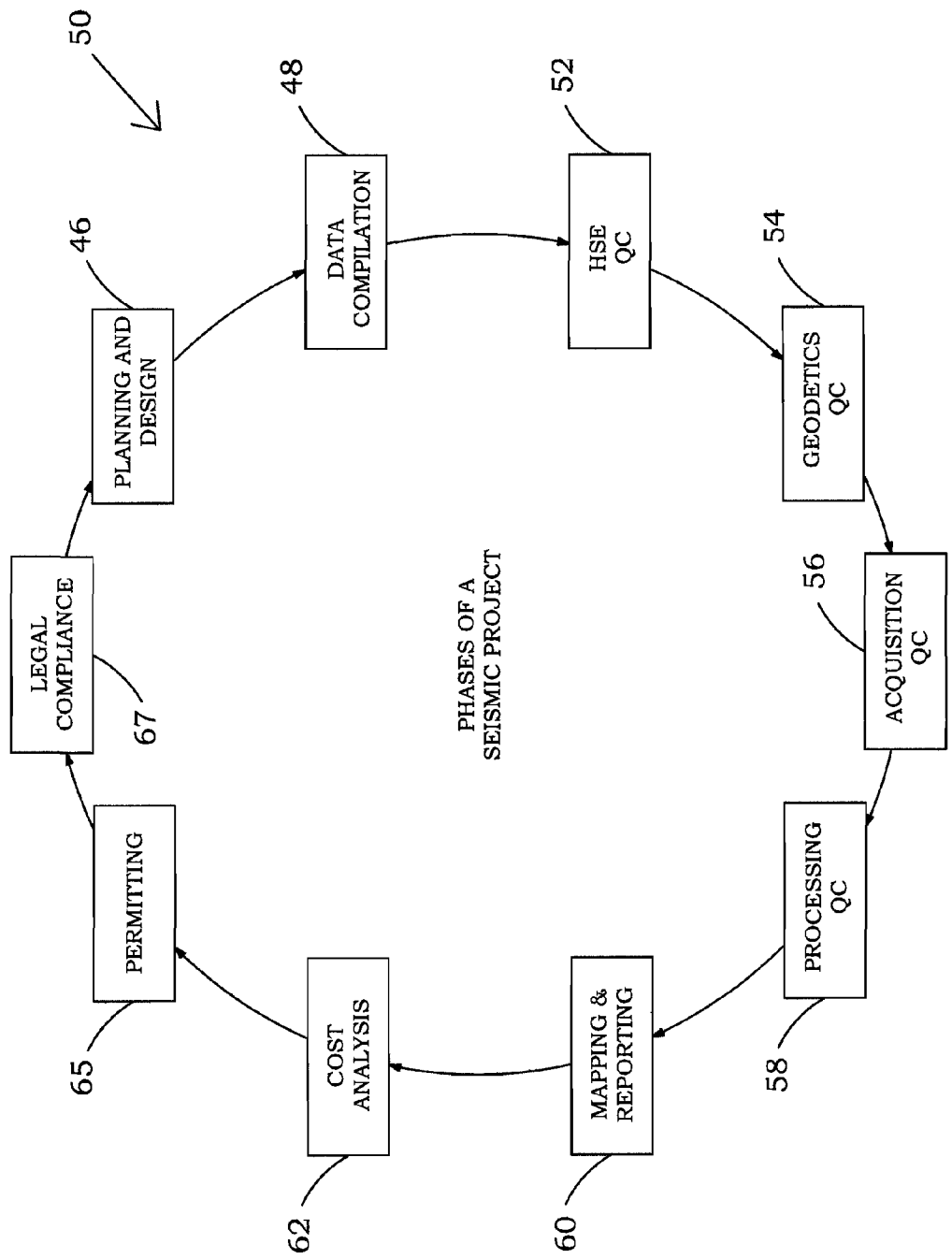
FIG. 2 is a schematic that shows a plurality of QC modules for the system of FIG. 1 which correspond to phases of a seismic project in accord with one possible embodiment of the present invention.
Figure 24:
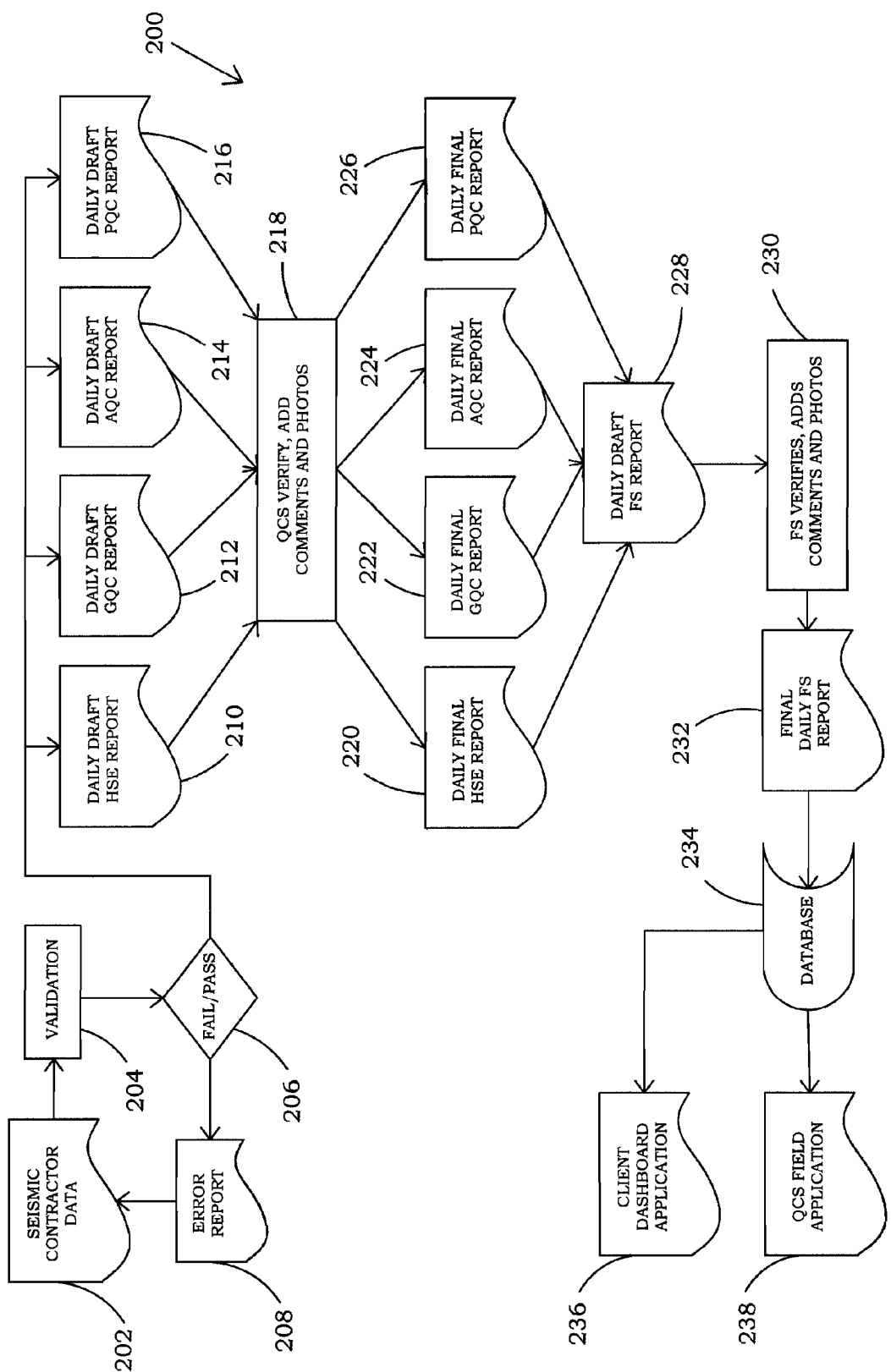
FIG. 24 is a flow diagram schematic for computer generated reports produced utilizing the hardware system of FIG. 1 in accord with one possible embodiment of the present invention.

Programmable GPS units 38 are utilized for inputting GPS stamped data for the modules for seismic acquisition operation 50 (FIG. 2). Programmable GPS units 30 may be used at base camps, helicopter air camps, ports, on ships, along shot lines, and at other areas within the general area of the seismic acquisition operation where inspections occur. Data for programmable GPS units may be of various types including data which is input via keystrokes stamped with GPS location data, recorded digital images stamped with location data, data input from test equipment, and the like. Programmable GPS units 38 are programmed to receive and organize inspection input data over time to produce inspection output data, which is transmitted to web server 28 over Internet network 26. Data from programmable GPS units 38 is used in the report generation, along with other data input for report generation, an overview of which is shown in FIG. 24.

QC hardware system 10 shown in FIG. 1 may also comprise computers 68, which connect to the database server through web server 28 and certificate server 14. Computers 68 may be utilized within the general area of the seismic acquisition operation by clients 22 and QC personnel 24 where inspections occur. Accordingly, although the servers are remotely located, they allow connectivity to various authorized users who may or may not be remotely located from the seismic project. Other computers connectable to the database server (through the certificate server and the web server), e.g. a lap top or desk top computer, may be utilized by administrators as indicated at 24 in FIG. 3, who have authority for configuration of quantitative quality performance indicators and/or tolerances and/or planning/configuration parameters stored in the database server, as discussed hereinafter.

The seismic project may be considered to have a plurality of different phases where quite different types of actions occur and wherein some phases may encompass other phases. Some goals or milestones for the different phases are accomplished in parallel. Quite different QC personnel expertise is needed in different phases of the seismic acquisition project.

Modules in web server application, such as those shown in seismic project modules 50 of FIG. 2 may be utilized to enhance and verify expertise in an organized manner, which corresponds to the phases or functions of the seismic project. For instance, during a planning/configuration phase, planning and design module 46 is used to set up master tables with code types, pre-plots, quality parameters by control phase, objectives for the contracts such as milestones for the various phases, and so forth.

As another example, an HSE phase may encompass many seismic operation phases, and utilizes HSE QC module 52 throughout many phases of the seismic operation. As another example, in a geodetics phase of the seismic acquisition project, prior to acquiring seismic information, land surveys must be made before laying the shot lines, which utilize geodetics QC module 54. In the acquisition phase, the QC personnel would utilize acquisition QC module 56. After seismic data is collected, processing QC module 58 may be utilized, typically by different QC personnel having different skill sets. More specifics of the QC modules are discussed hereinafter.

Accordingly, FIG. 2 shows possible modules of web server application 34, which correspond to phases of seismic project 50. In one possible embodiment of the invention, the modules may comprise planning and design module 46, data compilation module 48, health, safety and environment (HSE) QC module 52, geodetics QC module 54, acquisition QC module 56, processing QC module 58, mapping and reporting module 60, and cost analysis QC module 62, permitting 65 and legal compliance 67. The modules and underlying processes are discussed in more detail hereinafter.

FIG. 3 shows data inputs for use in QC software modules 70. Data may be received for use by various modules, e.g., HSE QC module 52, Geodetics QC (GQC) and Acquisition QC (ADQ) modules 54 and 56, COST QC module 62, discussed hereinafter, also shown in FIG. 2. Other inputs shown in FIG. 3 may comprise administration input 64 for data types, codes, parameters, users, and the like. Contract management 66 is utilized to oversee quality control for many projects, and for individual contracts within each project, and for individual phases within each contract. Data gathering input 49 may be utilized to provide data not obtained via other inputs, such as contractor data, equipment test data, and the like, as discussed hereinafter.

The integration of data into electronically scalable maps for the QC system operation may be accomplished using ARCServer v 9.3.2. The maps can be embedded in displays produced by QC system hardware 10, e.g., the client field or dashboard, discussed hereinafter, using C# language.

In overview, database server 20 and/or web server 28 may be programmed for receiving at least three general types of data over Internet network 26 which may at least comprise: (1) seismic instrument operation data which may comprise test data for geophones, recording instruments, vibrators, and other seismic instruments (2) contractor data which is data supplied in computerized daily reports in a computer acceptable format from different contractors which may concern the many different services provided and (3) the inspection output data such as GPS stamped scores and image data from the programmable GPS unit. While the above are three general types of data, many sub types of data may be utilized within these three groups, some of which are listed in the associated chart of FIG. 4 for data gathering, e.g. pre_plot_sps, contractor_daily_report, post_plot_GQC, vaps_raw, fdu_raw_, and the like.

Thus, one or more processors programmed by software in associated memories may be remotely located from the seismic acquisition operation, e.g. database server 20 located behind firewall 18 and outside of the area where the quality inspections occur and/or the seismic survey is to be performed.

As one example of data that is transmitted via Internet network 26, programmable GPS units 38 may comprise templates which are utilized by inspection personnel for inputting consistently organized inspection scores, which can then be transmitted to database server 20 as one type of data. Typically, for additional verification and for oversight purposes, this data will be stamped with GPS data to verify the position at which the data is inputted. Accordingly, it can be verified that QC personnel are at the location at which inspections are required. Moreover, the resulting data and/or functions of this and other accumulated data can then be plotted on an electronically scalable map using GPS coordinates.

Figure 5:
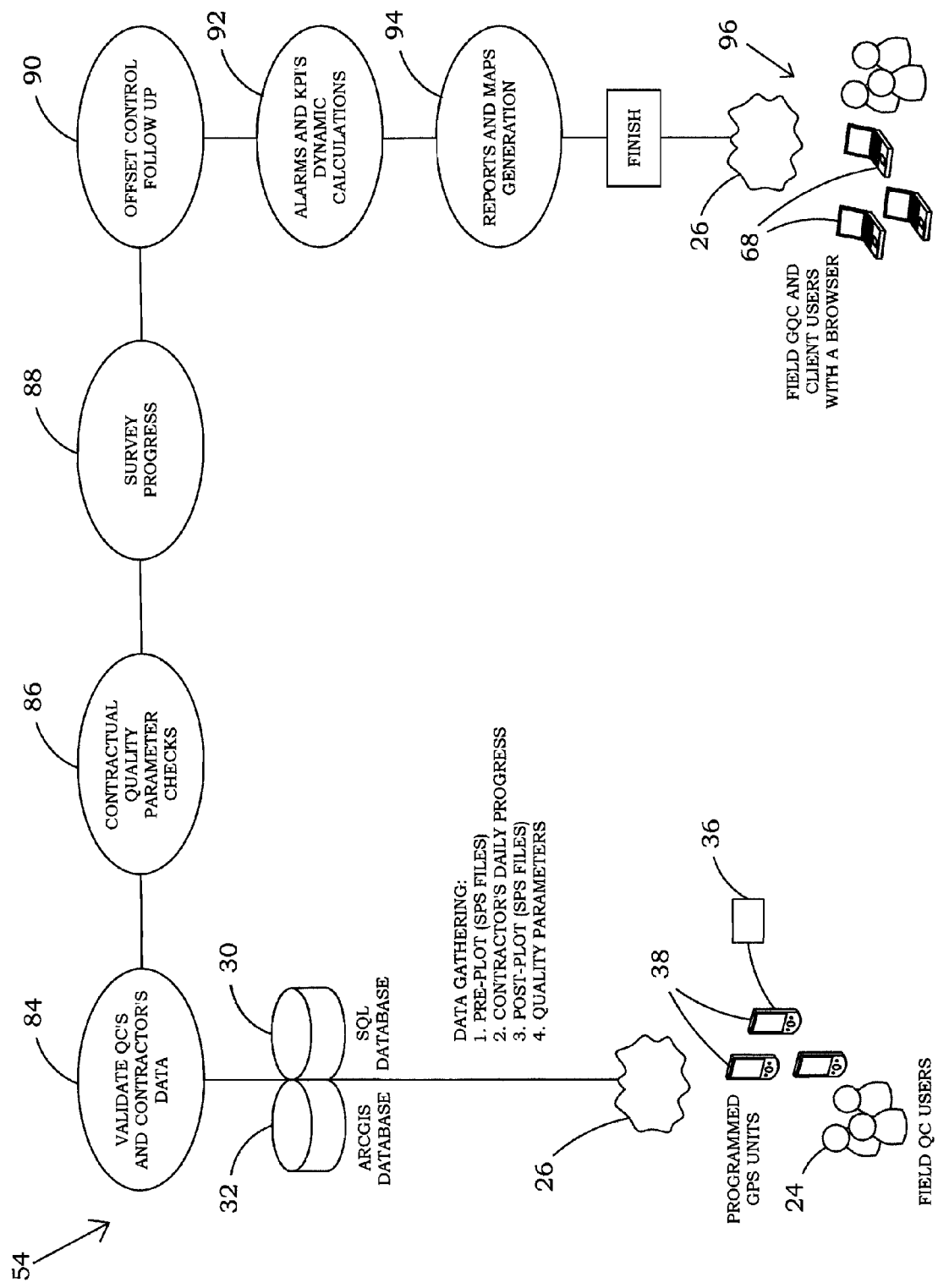
FIG. 5 is a schematic that shows the general process flow for a geodetics QC module of FIG. 2 for use in the system of FIG. 1 in accord with one possible embodiment of the present invention.

Referring now to FIG. 5, there is provided an overview of process flow for geodetics QC (GQC) module 54, which is also shown in FIG. 2. In this embodiment, and also referring again to FIG. 1 and FIG. 3, during operation geodetics QC module 54 may typically utilize webserver 28, database server 20, and programmable GPS units 38, which are programmed utilizing data from relational database 30 and geographical database 32, as well as web server application 34 and mobile application 36.

The data gathering for geodetics QC module 54 comprises pre-plot data, contractor daily progress data, post-plot data, and quality parameters. Examples of these types of data and some outputs are shown hereinafter.

Pre-plot data comprises the desired layout of seismic plots, such as source and receiver lines, which are selected to obtain a good evaluation of the subsurface formation of interest. Post-plot data comprises the seismic plots as actually laid out. There may be changes to the pre-plot data due to structures such as roads, pipelines, canals, and other geographical features.

The contractor's daily progress may comprise the actual amount and location of the seismic lines, source locations, receiver locations, and source records. Quality parameter may involve comparison of pre-plot to post-plot data, verification of the receiver and source locations, and how they were implemented. The quality parameters may also comprise GPS stamped image data of receiver lines or shot lines merged onto electronically scalable maps, which pinpoint the location and types of errors which occur, e.g., a seismic signal receiver which is not oriented correctly. The data may be incorporated onto maps along with the desired business rule information utilizing relational database 30 and geographical database 32.

Figure 11:
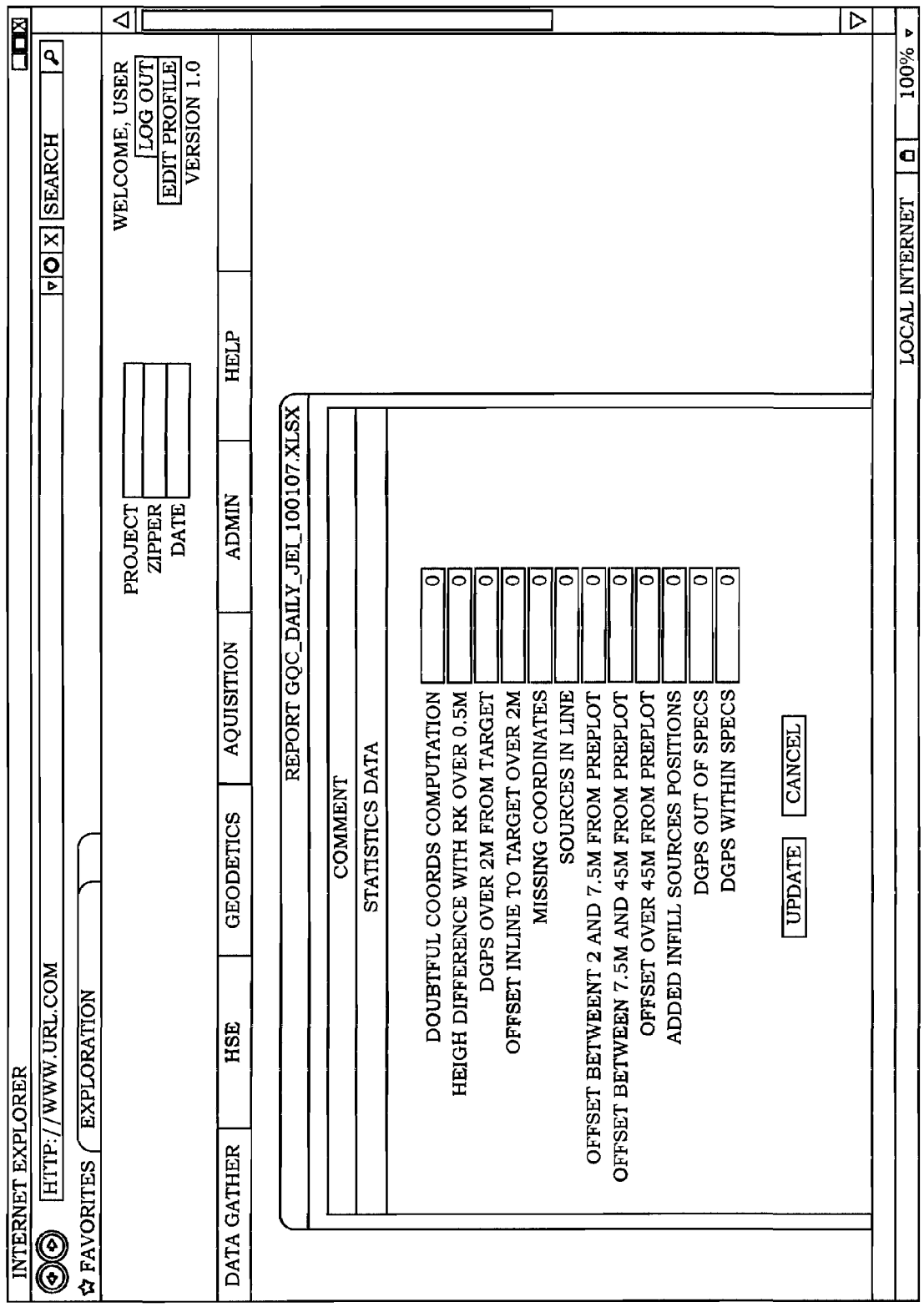
FIG. 11 is a screen showing geodetics QC parameters for judging quality of the placement and/or positioning of checking sources and receivers in accord with one possible embodiment of the present invention.

As indicated at 84 in FIG. 5, the data is validated for completeness and internal consistency. As indicated at 86, contractual quality checks may compare the measured accuracy, quantity, and quality of data gathering with the contracted accuracy, quantity, and/or quality. Other geodetics QC parameters may comprise checking sources and receivers for doubtful coordinate computation, height differences, degrees of offset variations as indicated at 90, and the like. An example of various QC potential problems is shown in a listing in screen in FIG. 11, which may comprise QC measurements that are made utilizing programmable GPS unit 38.

If desired, geodetics QC module 54 may be utilized to produce various types of alarms, which may be triggered by quality performance indicators calculated utilizing the incoming data. Various types of quality performance indicators, sometime referred to herein as KPI's, comprise dynamic or ongoing calculations may be made. These are discussed hereinafter.

Geodetics QC module 54 utilizes data to produce summary reports, displays, and/or map displays as indicated at 94. Some examples are discussed hereinafter. Moreover, geodetics QC module 54 may be utilized to produce detailed reports in very little time utilizing accumulated data so that QC personnel can spend more time on inspections and less on reporting. The reports and data merged electronically scalable maps are available over Internet 26 to clients and QC personnel as indicated at 96.

Geodetics QC module 54 may typically be utilized to compare pre-plot data of sources and receivers, post-plot data, daily lay outs and recording based on the contractor data as verified with inspection output data, and quality parameters produced by QC personnel.

Figure 6:
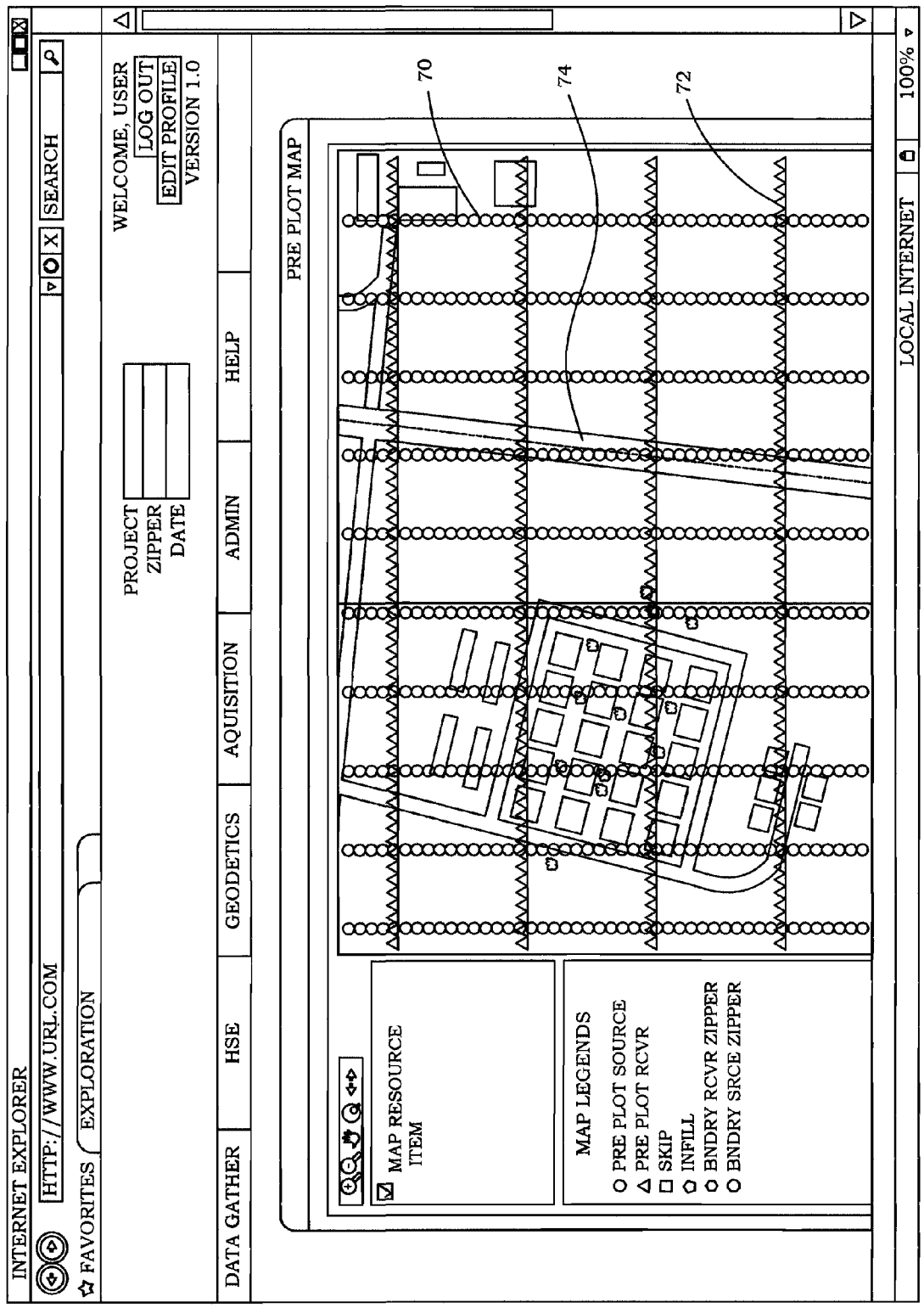
FIG. 6 is a display which may be produced by the geodetics QC module of FIG. 5, which shows pre-plot data inserted into an electronically scalable map in accord with one possible embodiment of the present invention.

Pre-plot data may be obtained from the client and/or contractor and generally provides the desired locations for plots of sources 70 and plots of receivers 72, examples of which are shown on the map of FIG. 6. Source plots may comprise lines on which shots or vibrators are spaced apart from each other by a selected distance. Receiver plots are lines of receivers spaced apart from each other. The plots of sources may be arranged generally orthogonal to the receivers. The source and receiver plot layouts are selected by the clients to obtain the best seismic picture of underground geological formations.

The location of the source and receiver lines 70 and 72 may comprise geodetic or surveying references as best available for accurately locating the source and receiver lines. The source and receiver lines 70 and 72 may comprise thousands of sources and/or receivers. For example, referring to the geodetics QC report 100 shown in FIG. 10, in line 24, for a seismic project the number of survey receivers positioned in one year was 175,264 for a particular seismic acquisition project. QC report 100 also provides information about the sources, receivers, records over time as compared to the total anticipated or required by the project contract.

The ideal source and receiver lines may not be realized due to structures such as buildings or, for example, road 74 shown in the data merged electronically scalable map of FIG. 6, and are therefore re-routed, to provide post plot lines. The present invention provides various maps with data merged thereon for easy viewing by the client.

Figure 7:
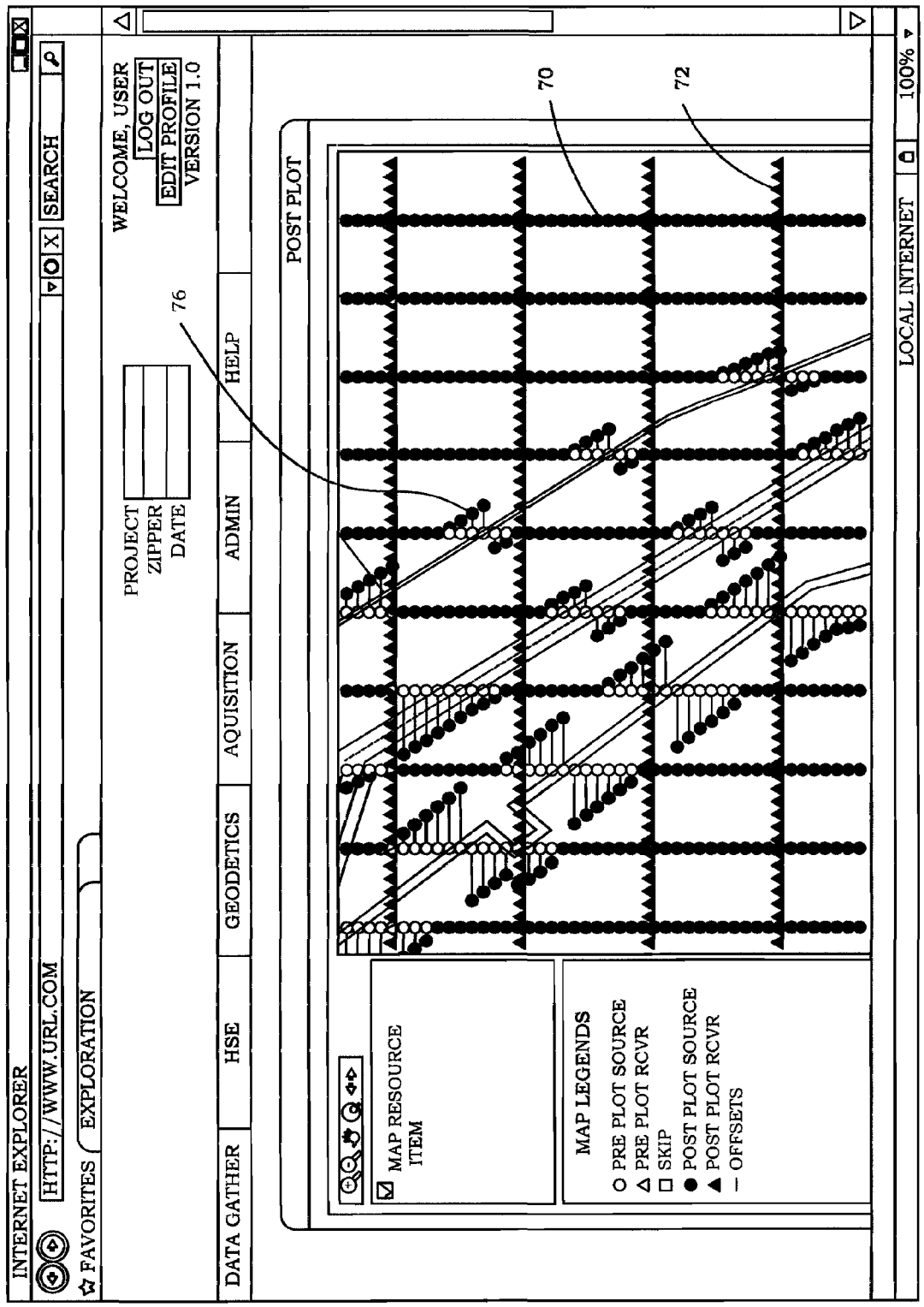
FIG. 7 is a display which may be produced by the geodetics QC module of FIG. 5, which shows pre-plot data versus post-plot data offsets inserted into an electronically scalable map in accord with one possible embodiment of the present invention.

FIG. 7 displays another data merged electronically scalable map that shows how source lines 70 are re-routed where necessary. For example, re-routed source lines 76 have been moved to avoid features on the ground. In one aspect of the present invention, clients 22 utilizing the system in one country may view an enlarged scale map with of the geographical features where the seismic project is ongoing, and view the actual location of post-plot source lines on an electronically scalable map, which often visually shows why the lines have been re-routed. Thus, in accord with the present invention, the electronically scalable maps from maps database 32 are merged with post-plot data utilizing applications of the present invention.

Figure 8:
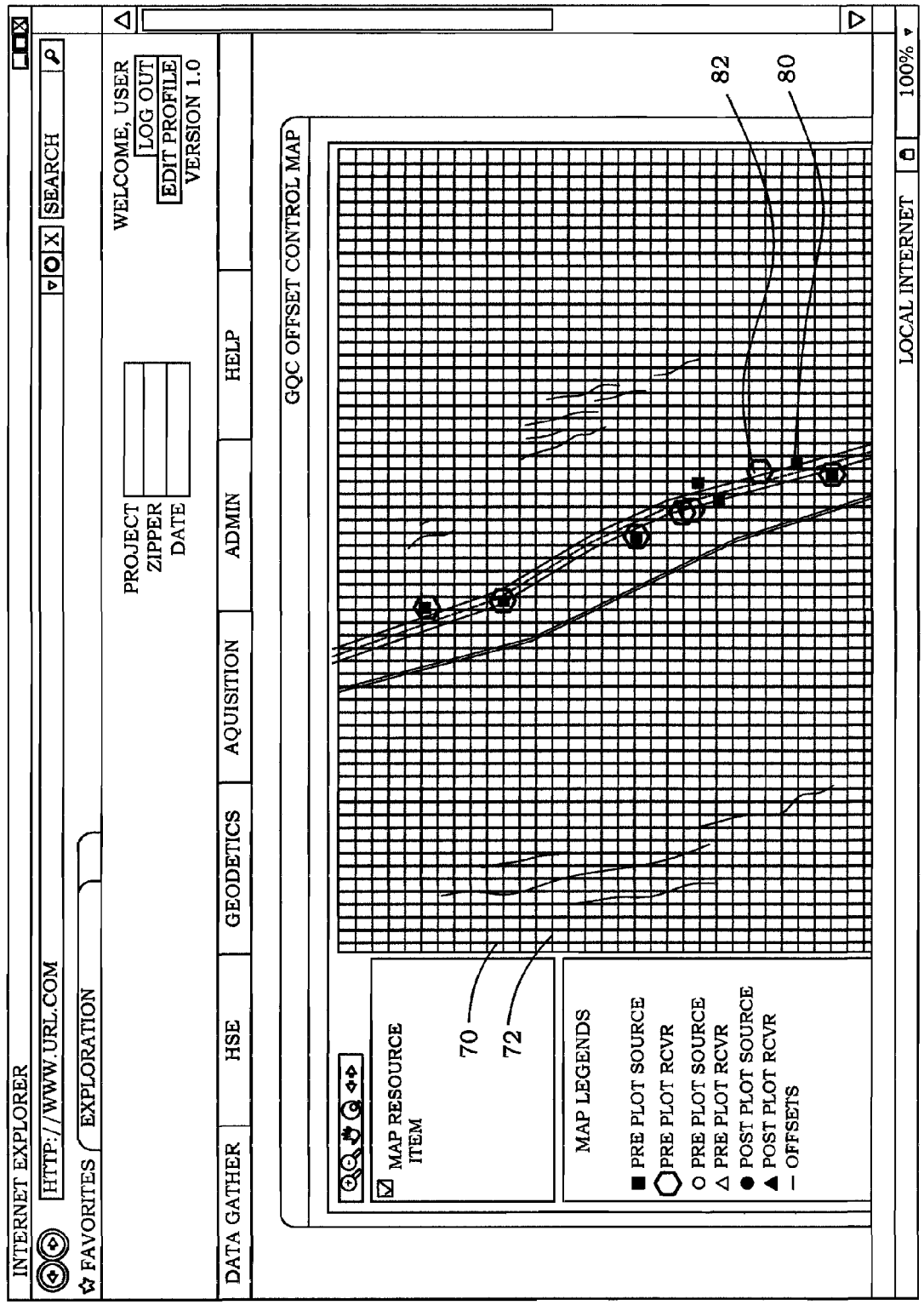
FIG. 8 is a display which may be produced by the geodetics QC module of FIG. 5, which shows pre-plot data versus post-plot data inserted into an electronically scalable map comprising indicators for offset differences in accord with one possible embodiment of the present invention.

In another embodiment of the invention, as illustrated in the data merged map of FIG. 8, post plot data, as well as pre-plot data is illustrated on an electronically scalable map utilizing informative indicators, such as comparative difference indicators 80 and 82. In this example, comparative difference indicators 80 indicate offsets in the range of 60 or 70 meters between pre-plot data and post-plot data. Indicators 82 represent offsets greater than 70 meters. A client may easily see the comparative difference indicators on the electronically scalable map as shown in FIG. 8 and then zoom in or enlarge the location of the indicator to obtain a close-up view like that of FIG. 7, which may show why the lines were re-routed, such as due to existing physical features such as roads, houses, pipelines, and the like.

Figure 9:
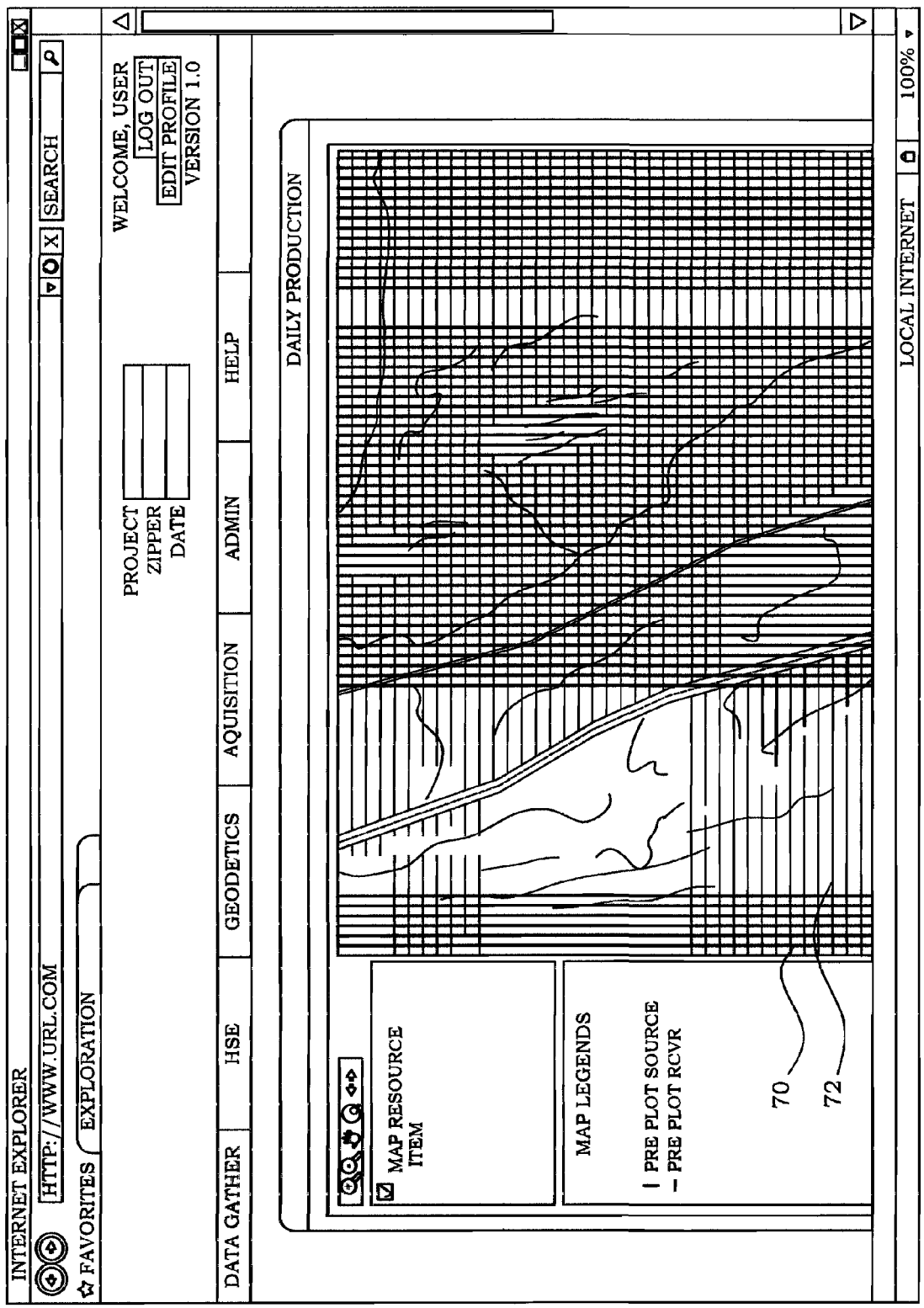
FIG. 9 is a display which may be produced by the geodetics QC module of FIG. 5, which shows pre-plot data versus post-plot data inserted into an electronically scalable map comprising daily production in accord with one possible embodiment of the present invention.

FIG. 9 shows an electronically scalable map merged with data comprising daily production in laying out sources 70 and receivers 72. By looking at the daily production, monthly or yearly production as compared to the overall project, a user can readily see the progress of the seismic acquisition operation.

Figure 12:
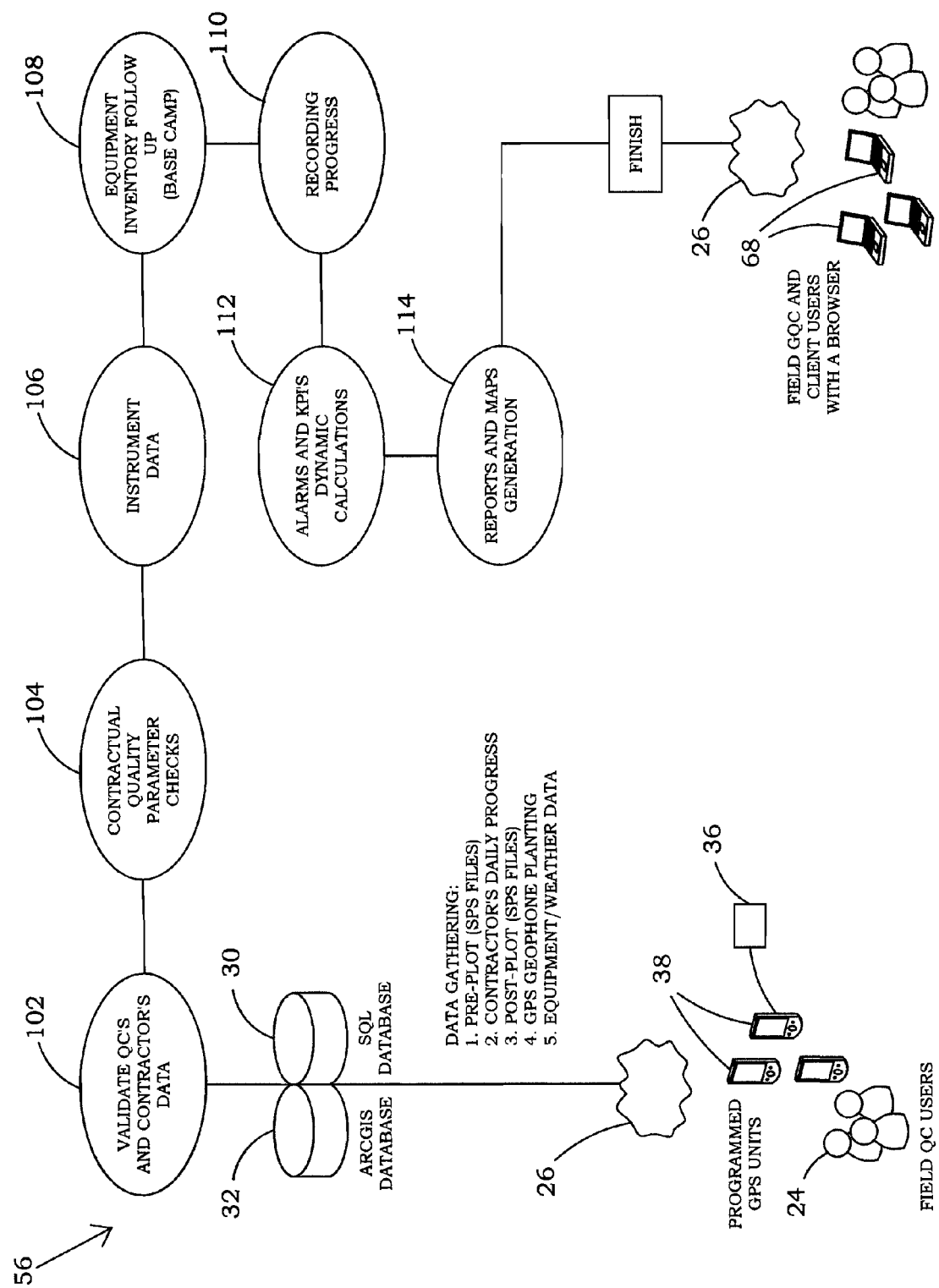
FIG. 12 is a diagram showing general process flow for an acquisition QC module from FIG. 2 for use in the system of FIG. 1 in accord with one possible embodiment of the present invention.

Referring now to FIG. 12, there is shown a schematic, which provides an overview of a process flow for acquisition QC (AQC) module 56, which is also shown in FIG. 2.

Data gathering for acquisition QC module comprises pre-plot files, contractor's daily production, post-plot data, GPS planting phone QC data, equipment QC data, and/or other data such as weather, and the like. The data may be incorporated onto maps along with the desired business rule information utilizing relational database 30 and geographical database 32. The data is validated for completeness and internal consistency as indicated at 102.

As indicated at 104 in FIG. 12, contractual quality checks may compare the measured accuracy, quantity, and quality of data gathering with the contracted accuracy, quantity, and/or quality. Instrument data analysis is measured, such as noise, phase, force, and the like, as indicated at 106. An equipment inventory as indicated at 108 at each base camp is kept with the associated instrument data analysis. The recording progress 110 of the seismic operation is also utilized as part of acquisition QC module 56, as illustrated in a variety of reports and data merged electronically scalable map displays as indicated at step 114. A few examples are provided hereinafter.

Acquisition QC alarms and KPI's or dynamic calculations as indicated at 112 can be provided as part of this module. Details of alarm operation and KPI's are discussed hereinafter in conjunction with HSE QC module 52.

Figure 13:
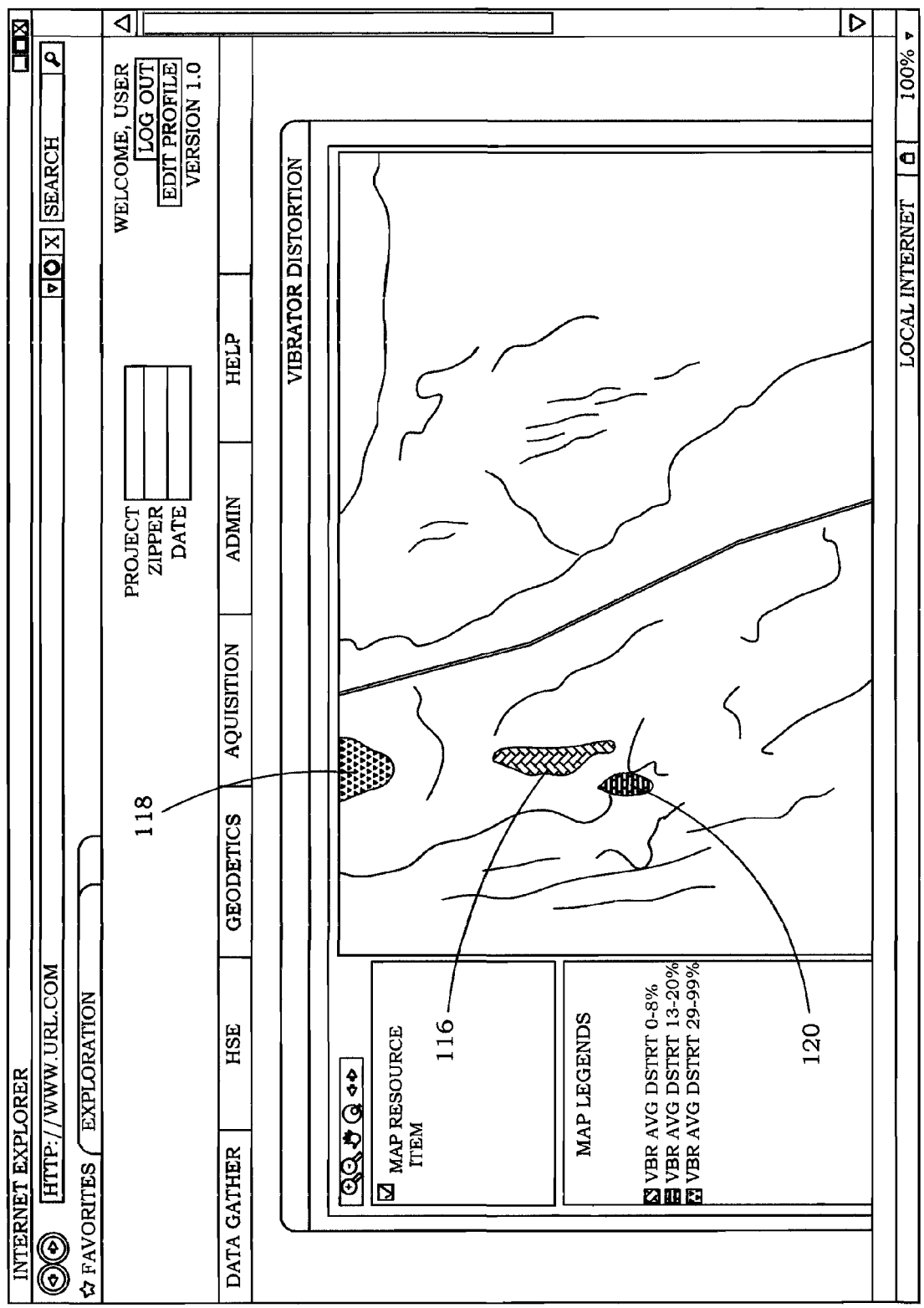
FIG. 13 is a display that may be produced by the acquisition QC module of FIG. 12, which shows vibrator distortion inserted into an electronically scalable map comprising source and receiver plots in accord with one possible embodiment of the present invention.

FIG. 13 provides one possible example of instrument data analysis merged onto an electronically scalable map for the various instruments utilized in a portion of a seismic acquisition project. Although various types of instrument data analysis information could be plotted on a seismic data merged map in accord with the present invention, the example of FIG. 13 shows ranges of vibrator average distortion, e.g. low vibrator distortion range 116, moderate vibrator distortion range 118 and high vibrator distortion range 120. The graphics of the display may be very fine to allow a high definition picture of distortion when the map is electronically zoomed in to possibly show each different source position reading. As well, there may be many different ranges of vibrator distortion and the display may be color coded for easier viewing.

Figure 14:
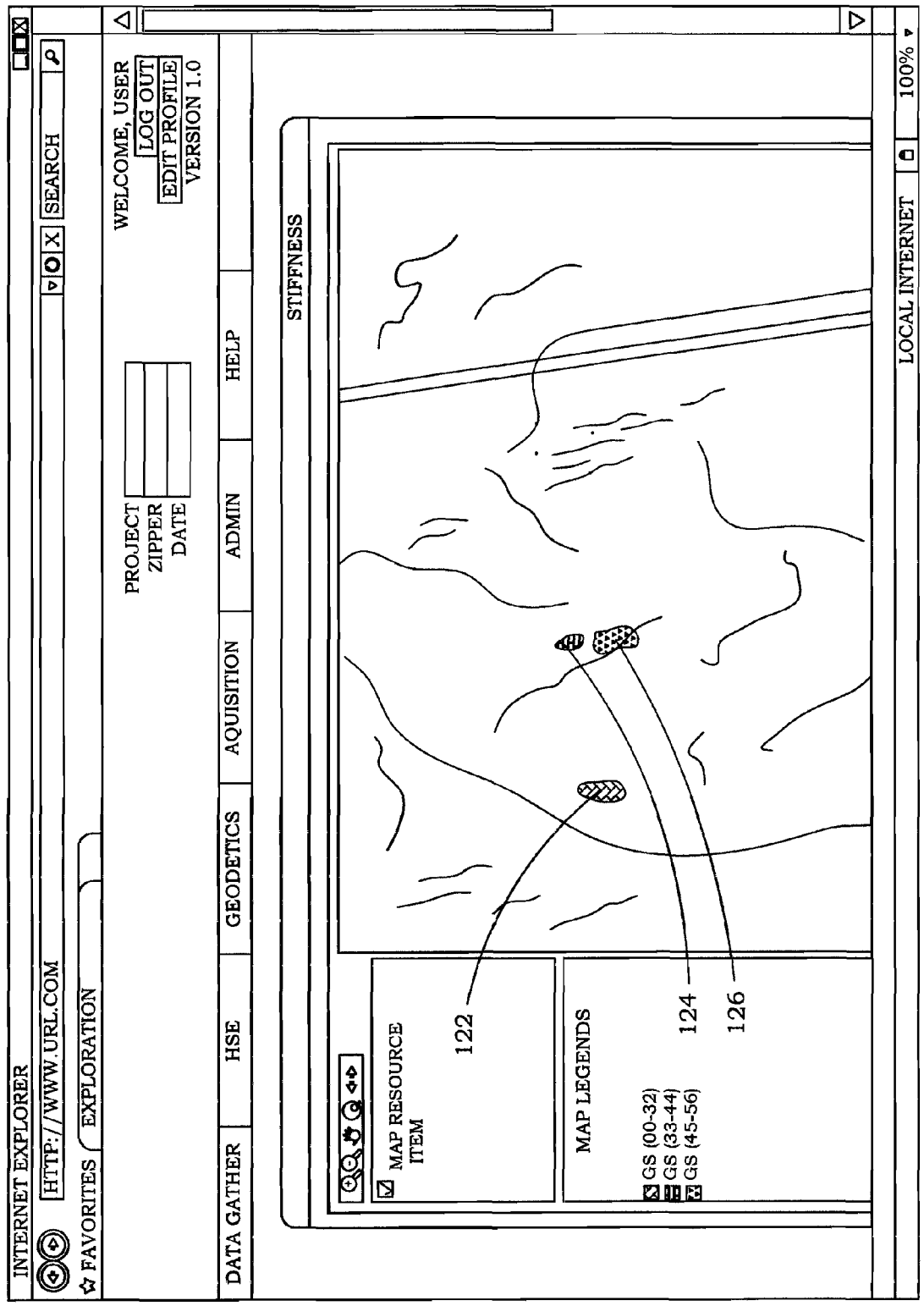
FIG. 14 is a display that may be produced by the acquisition QC module of FIG. 12, which shows stiffness measurements inserted into an electronically scalable map comprising source and receiver plots in accord with one possible embodiment of the present invention.

FIG. 14 provides another possible example of instrument data merged with respect to an electronically scalable map, wherein various ranges of stiffness are plotted generally along the source lines, e.g., low stiffness region 122, moderate stiffness region 124, and high stiffness regions 126. Again, various ranges of quantitative values may be utilized with different color coding as part of the seismic data merged map.

FIG. 15 discloses one possible example of acquisition QC report 128. The report may provide information related to recording production, reshoots by overlap, chargeable source points, VSP, UH, vibrator test results, FDU, and geophone recorder tests, and the like.

Figure 16:
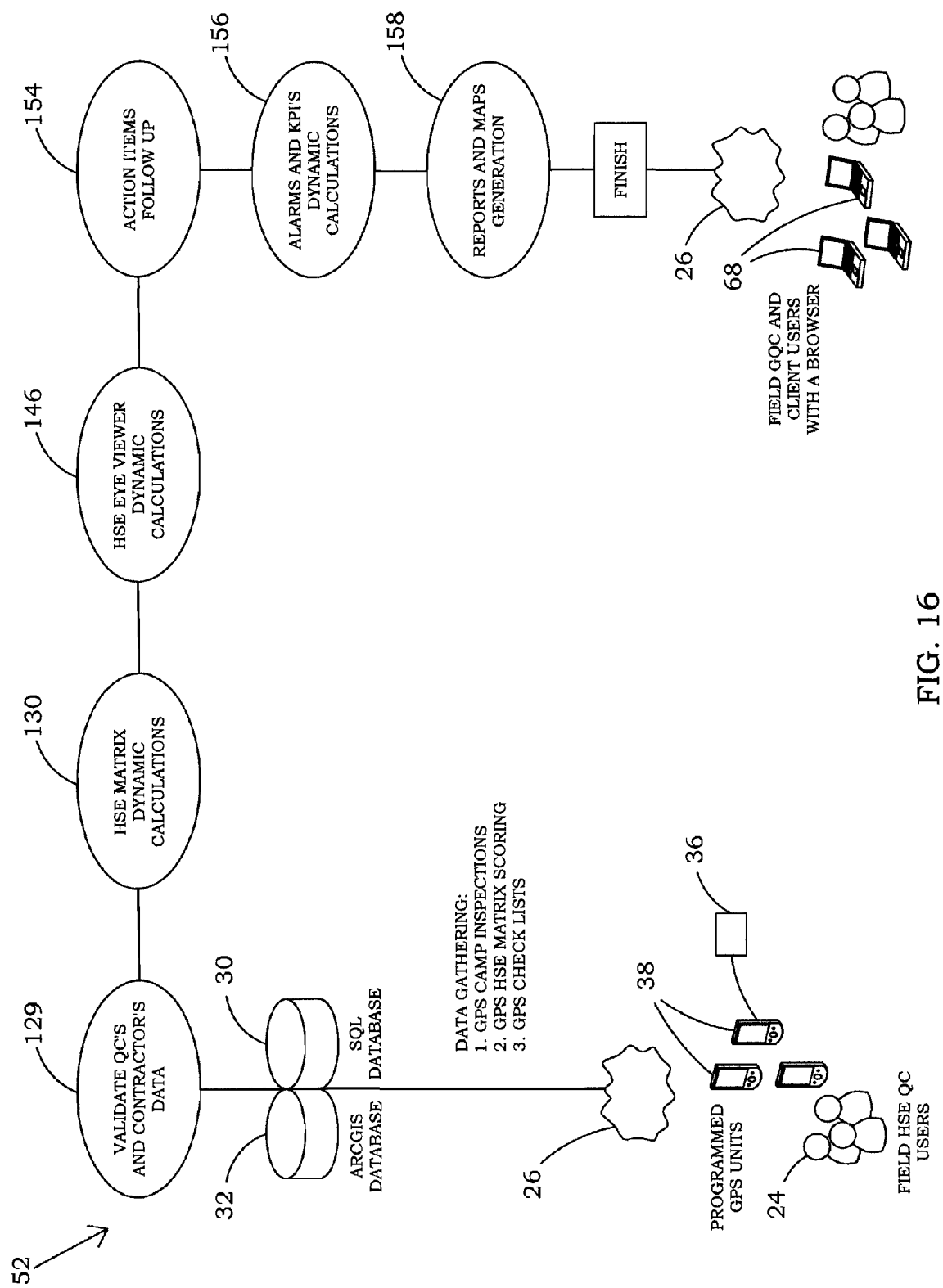
FIG. 16 is a diagram showing general process flow for an HSE QC module for use in the system of FIG. 1 in accord with one possible embodiment of the present invention.

Referring now to FIG. 16, there is shown an overview of the process flow of HSE QC module 52, which was discussed briefly with respect to FIG. 2. In this embodiment, and also referring again to FIG. 1 and FIG. 3, during operation HSE QC module 52 may typically utilize webserver 28, database server 20, and programmable GPS units 38, which are programmed utilizing relational database 30, geographical database 32, web server application 34 and mobile application 36.

Programmable GPS unit 38 is utilized at least in part to populate seismic QC matrix 130 of HSE QC module 54, which is displayed in small part in FIG. 19. In seismic QC matrix 130, the columns may comprise Departments and the rows may comprise Elements, Chapters, and Units, which are based on OGP standards or other standards. It will be noted that the terms Elements, Chapters, and Units have a special definition under OGP and are therefore terms of art. However, the columns and rows are user definable to other terms, if desired.

The data gathering or data inputs for HSE QC module 52 comprise GPS camp inspection data produced by contractors, QC personnel using programmable GPS units 38 to input GPS stamped which utilize GPS check lists, and GPS HSE Matrix scoring. The data may be merged into electronically scalable maps along with the desired rule information utilizing relational database 30 and geographical database 32. The input data is validated for completeness and internal consistency as indicated at 129.

Figure 17:
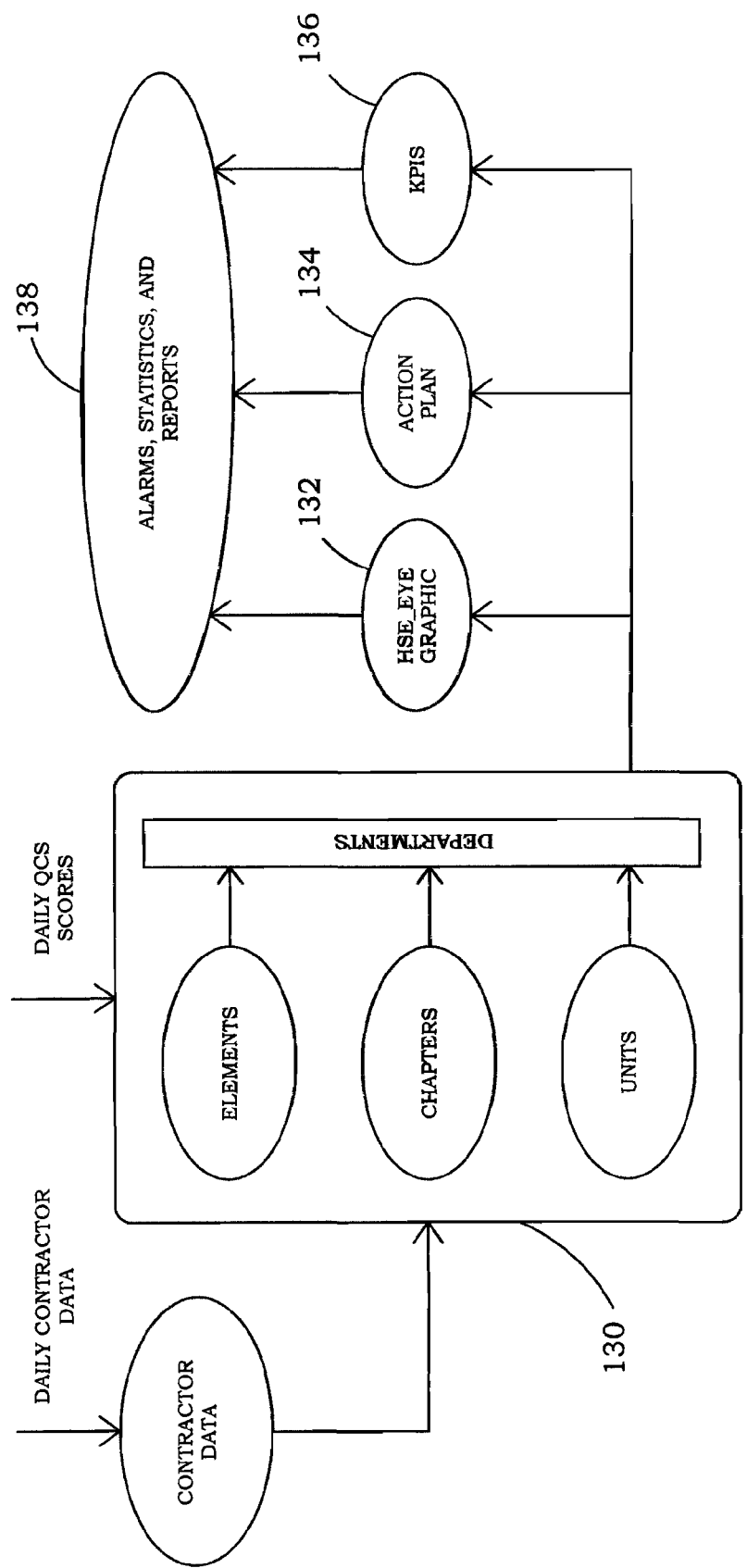
FIG. 17 is a diagram showing HSE QC module inputs and outputs in accord with one possible embodiment of the present invention.

FIG. 17 shows an example of possible HSE module 52 inputs and outputs. Digital contractor data and QC personnel data is input to seismic QC matrix 130, also shown in FIG. 19, and described in more detail hereinafter. As shown in FIG. 17, HSE module 52 utilizes matrix 130 to produce various outputs among which may be HSE EYE 132, action HSE plan 134, and HSE KPI's 136. These outputs are part of or used to produce HSE alarms, statistics, and reports 138.

The programmable GPS units 38 send data, such as GPS stamped inspection scores, to database server 20 via web server 28, whereby matrix 130 is populated. Referring to FIG. 19, scores, such as scores 140, and the frequency of production of scores may be provided for each individual cell, such as cells 142, in matrix 130. Scores of individual cells may be produced directly from inspection input data but may also comprise user definable formulas. For example, an inspector may inspect an item and enter a score, which perhaps ranges from 1 to 4 (or some other range) depending on the appraised quality. The inspection related scores may correspond to OGP standards or other user definable standards. Programmable GPS unit 38 is programmed to send the preferably GPS stamped inspection output data over Internet connection 26, which may be a wireless Internet connection, or may connect to another computer for this purpose.

Figure 20:
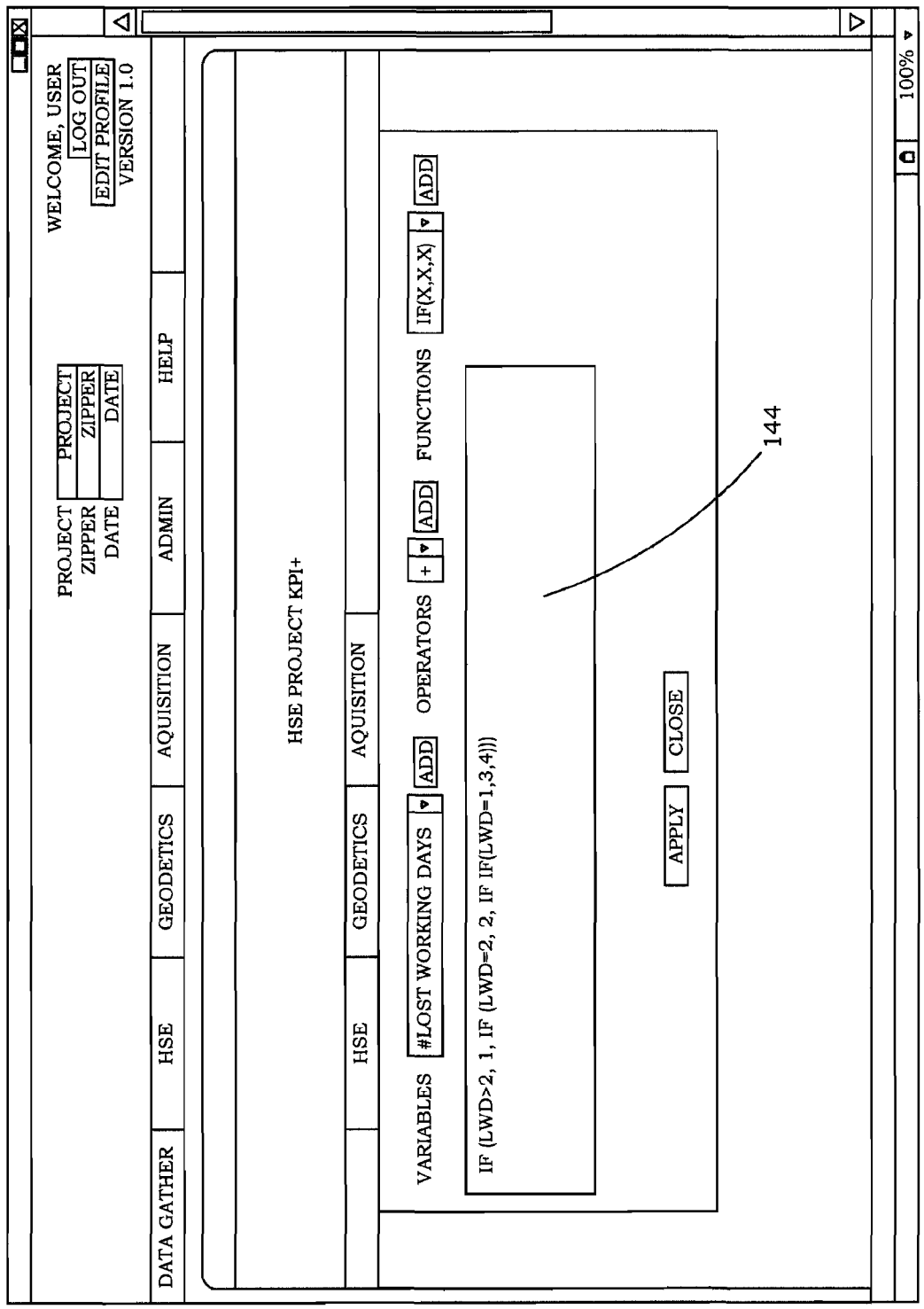
FIG. 20 is a display of a dynamic formula or KPI which may be edited for each cell of the matrix of FIG. 19 and/or for use in other QC modules in accord with one possible embodiment of the present invention.

Accordingly, in one embodiment of the invention, database server 20 is programmed to utilize a first set of configurable quantitative quality performance indicators (which may be referred to as KPI's) for any of the various modules discussed hereinbefore. An example of configurable KPI or quantitative quality performance indicator 144 is shown in FIG. 20. KPI formulas may be provided for any cell in the matrix or may be utilized with or without a matrix.

It is possible to pre-configure formulas for the KPIs and formulas to assign scores automatically when data is gathered in HSE matrix 130. Each cell in matrix 130 may have a dynamic formula associated therewith. The formula is evaluated when data is uploaded from the HSE contractor report and/or HSE QC personnel. Once data is captured, then the system automatically associates the data to a cell in matrix 130 and assigns a score based on the evaluation of the configurable formula. These formulas may have variables, operations, and functions.

Figure 21:
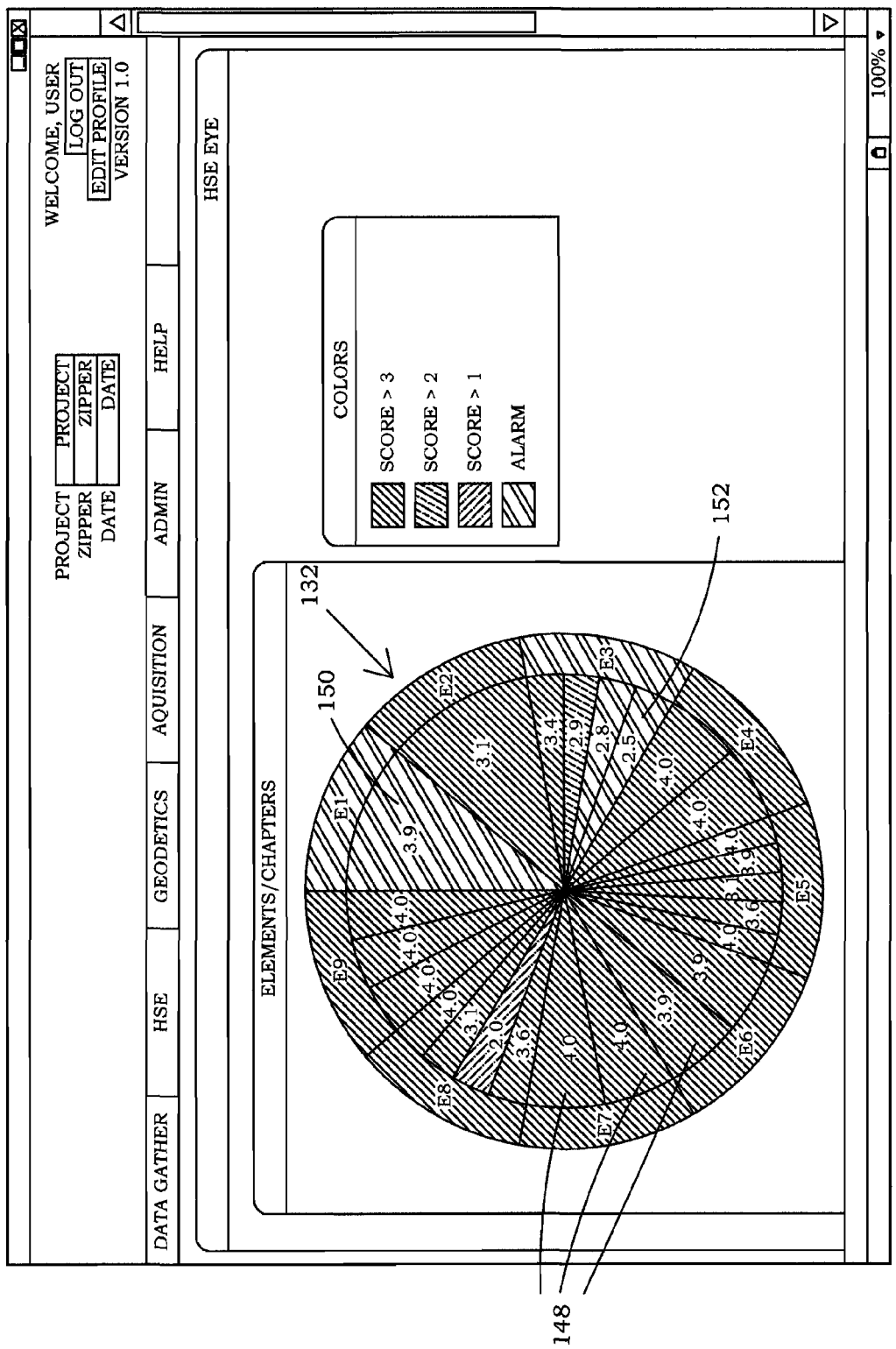
FIG. 21 is a display for an HSE eye view which is operable to electronically direct the user to problem areas of the matrix of FIG. 19 in accord with one possible embodiment of the present invention.

Referring to HSE step 146 shown in FIG. 16, HSE QC module 52 may utilize KPIs and/or produce other outputs such as HSE eye 132, shown in FIG. 21. For quickly overseeing the quantitative quality control of an operation with respect to HSE (health, safety, and environment), database server 20 and/or web server 28 may be programmed to produce a segmented display with color coded eye segments, such as eye segments 148 shown in FIG. 21 wherein colors are preferably utilized to indicate ranges of quantitative quality performance for the matrix. The circular HSE eye 132 is one possible embodiment for a display but other segmented displays may also be utilized. In one embodiment, color coded segments of HSE eye 132 can be utilized indicate potential incidents. For example, if a red color indicates problems in eye segments 150 or 152, then these segments can be selected to display detailed information for the potential incidents. For example, color coded eye segments may correspond to cells of matrix 130. Clicking on the eye segments lead to the cells of the matrix, which themselves can be expanded to provide more detailed information regarding the potential incident.

As one example, if a red colored segment indicates a serious problem or trend and green segments indicate an absence of problems or potential incidents, a manager can click on the red segment to get straight to the problematic issues instead of reading through detailed reports. To save management time, the manager may elect not to review the material of the green segments because there are not presently any QC indicated problems that require additional oversight.

Steps 154, 156, and 158 of FIG. 16 relate to various action items, which may result from predetermined alarms and approaches to solving problems, additional alarms and KPIs and/or reports and the like.

Referring to matrix 130 of FIG. 19, various alarms might be utilized. Vertical alarms might be triggered by an average score or other formula along vertical columns, e.g. vertical columns 156, with average score as indicated at 158. In one embodiment of HSE matrix 130, vertical columns may be associated with various departments, e.g., explosives, surveys, permits, or the like. Horizontal alarms might be produced when an average score or total or the like along one or more horizontal rows, e.g., horizontal rows 154, is higher than or lower than a desired value. In one embodiment, the rows might correspond to elements, chapters, and/or units. Sensitivity alarms might be produced by any combination of rows and columns in matrix 130.

Other types of alarms may comprise activity frequency alarms. For example, a frequency alarm might be sent if the score of a particular cell is not updated three times a week, which may correspond to three inspections a week.

In one embodiment, the plurality of alarms are associated with a notification list, and the notification list may vary depending on the length of time the alarm has existed and/or severity of the alarm.

Figure 18:
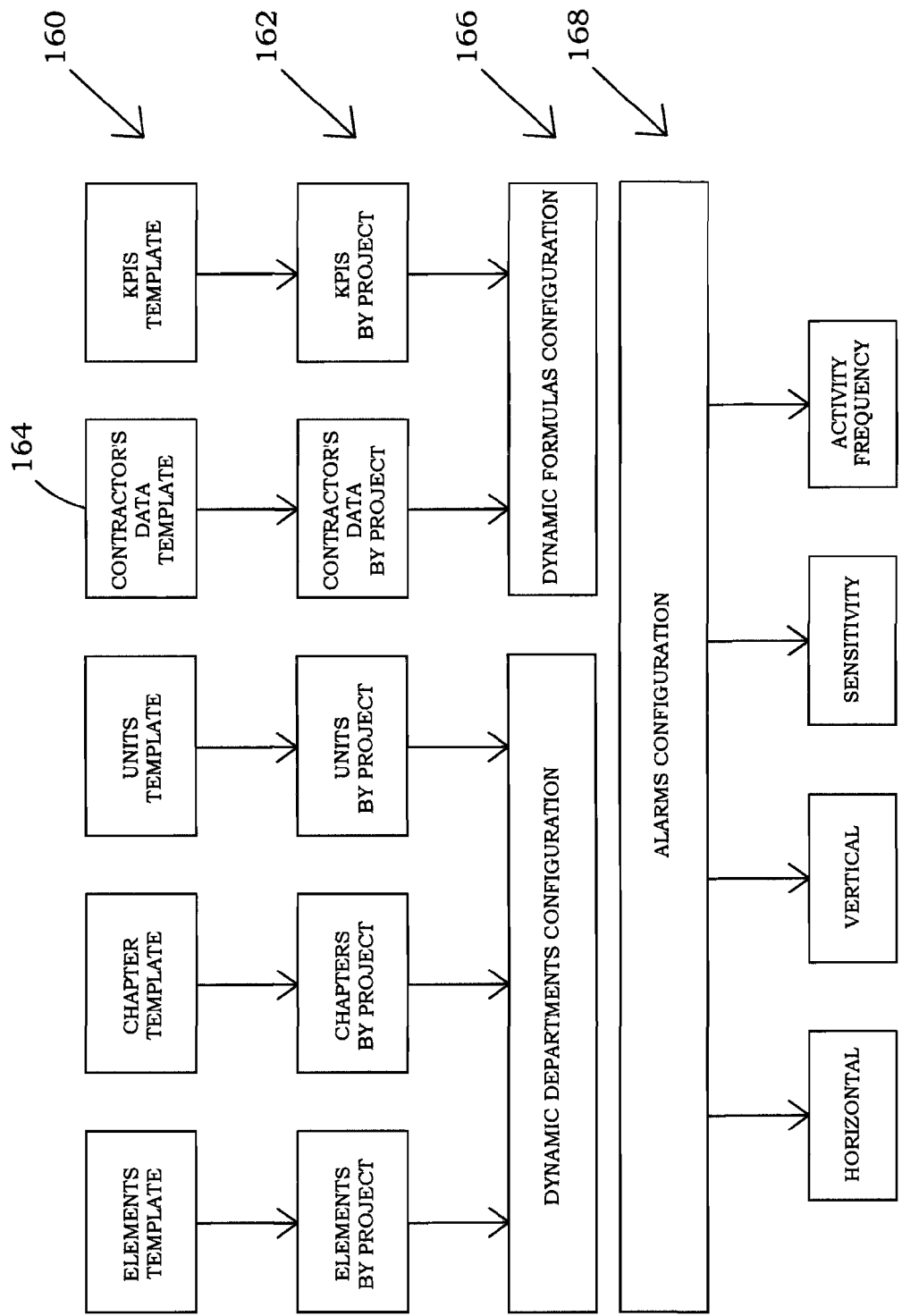
FIG. 18 is a diagram showing configuration of an HSE QC module in accord with one possible embodiment of the present invention.

Referring to FIG. 18, there is shown a general method for configuration of HSE QC module 52. Templates row 160 may comprise templates stored in database server 20 which are utilized for each project as indicated by project row 162. It may be noted that contractors data template 164 may comprise one or more prescribed templates for use by the various contractors, whereby data can be inserted directly into this module and/or other modules. The KPI's can be configured as indicated by dynamic formulas configuration row 166 and alarms can be configured accordingly as indicated at 168. As discussed above, the alarms may comprise horizontal alarms, vertical alarms, sensitivity alarms, and/or activity frequency alarms.

Figure 22:
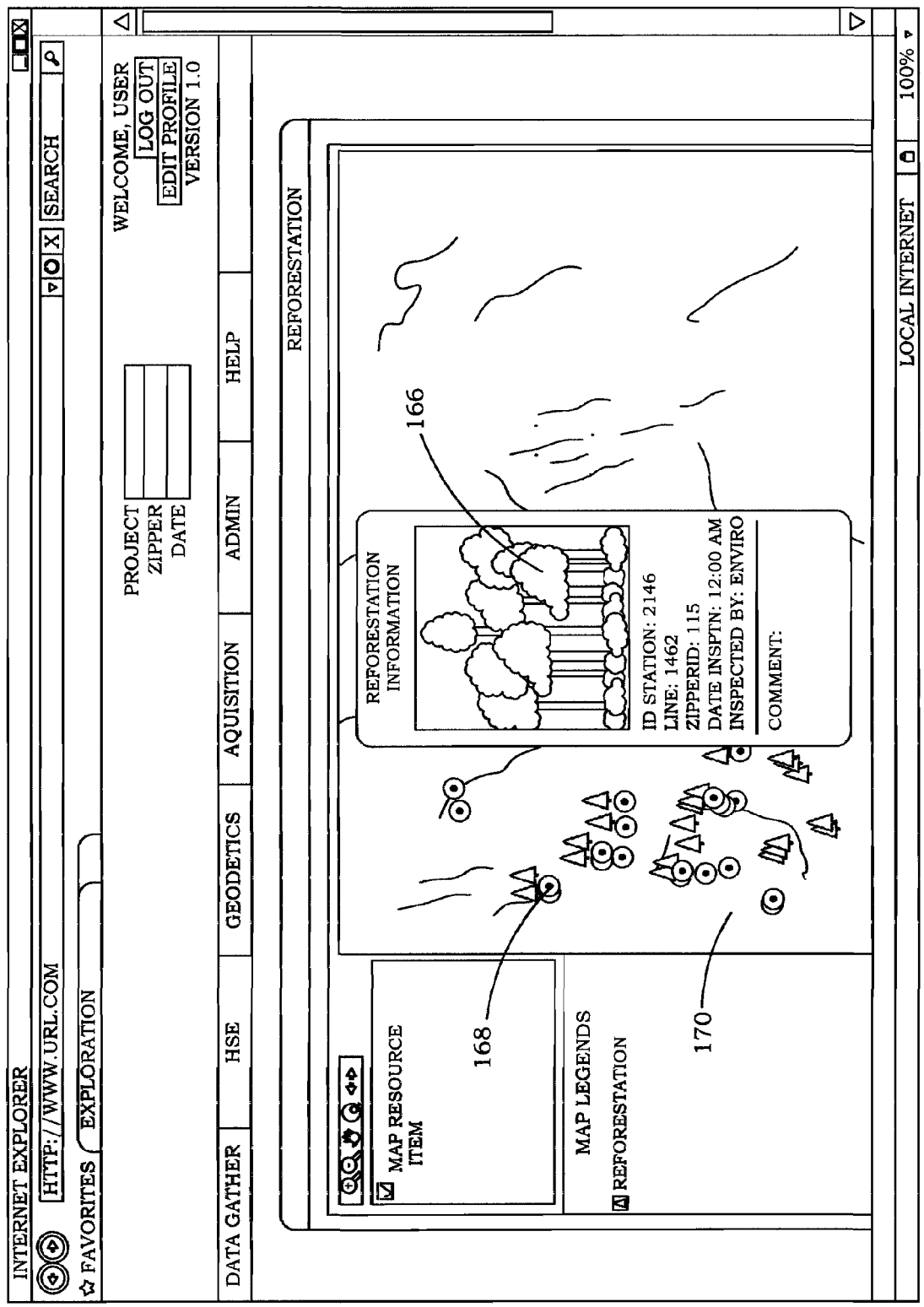
FIG. 22 is a display that may be produced by the HSE QC module of FIG. 16, which shows reforestation indicators and photographs that may be merged into an electronically scalable map that shows the region of the seismic project in accord with one possible embodiment of the present invention.

Programmable GPS units 38 may be utilized to verify that the location actually inspected correspond to the locations where the required inspections are to be made. One possible HSE output may comprise displays of GPS referenced reforestation data as indicated in FIG. 22. As one type of reforestation data, the inspection input data from the GPS programmable unit 38 comprises GPS position designated photographs of replacement of vegetation as indicated at 166 in FIG. 22. Reforestation indicators 168 of various types at positions on an electronically scalable terrain map 170 can then be selected and the client programmed to view digital images which provide visual QC evidence of the reforestation service at selected GPS points, e.g., before, during, and after.

Figure 23:
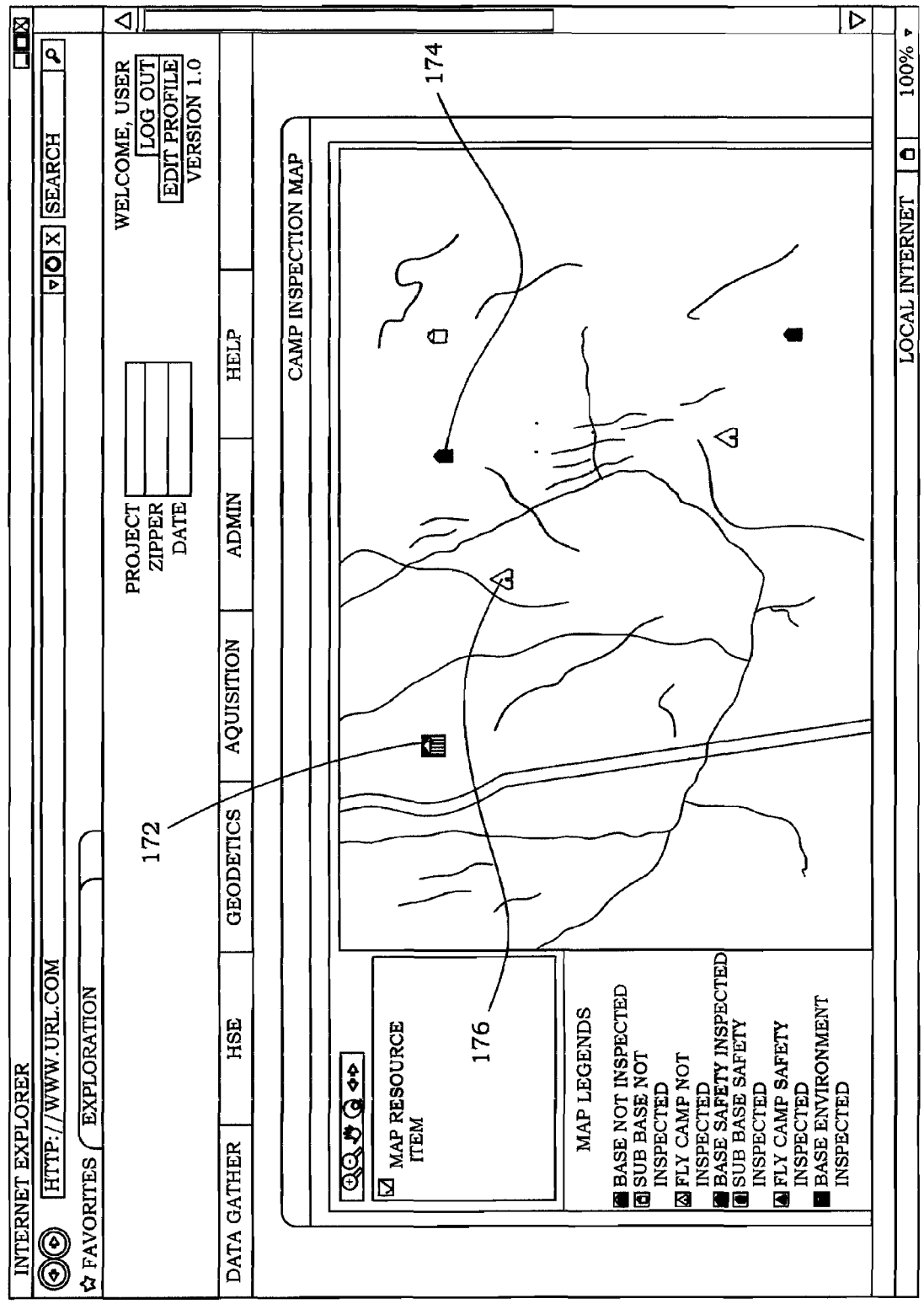
FIG. 23 is a display that may be produced by the HSE QC module of FIG. 16, which shows different types of camp indicators and their inspection status merged into an electronically scalable map that shows the region of the seismic project in accord with one possible embodiment of the present invention.

Another display produced by HSE QC module 52 might comprise a camp inspection map as indicated in FIG. 23 whereby various types of camps, and their various types of inspections are represented by various indicates. For example, a green base camp indicator at 172 might indicate a base camp that has been environment inspected. A yellow sub base camp indicator at 174 may indicate a sub base safety inspected camp. A red fly camp at 176 may indicate a fly camp that has not yet been inspected.

Accordingly, in operation, while many different KPI's or quantitative quality performance indicators may be utilized in the seismic acquisition operation phase of the seismic operation, the first set of quantitative quality performance indicators might be produced by comparing pre-plot data of sources and receivers and actual daily results from the contractor data as verified with inspection output data, as discussed and shown hereinbefore with respect to geodetics QC module 54.

As another example, a first set of configurable quantitative performance indicators may be produced when the actual daily results are compared to a plurality of ranges of respective configurable quantitative performance tolerances. Both the quantitative performance indicators and the tolerances thereof are user configurable but require an administrative authorization to do so. Thus, different clients can modify or create tailored desired quantitative quality control indicators and the associated required tolerances.

Accordingly, database server 20 and/or web server 28 may also be programmed to utilize configurable quantitative quality performance indicators for the seismic signal recording phase, which is referred to herein as an acquisition QC module 56. In this example, the KPI's or quantitative quality performance indicators are produced by at least comparing instrument operation test results for a plurality of seismic instruments to respective configurable quantitative performance tolerances. As one example, an inventory of all seismic instruments to be utilized is made and tested at intervals to verify that each of the instruments are within a user definable desired operation range, e.g., vibrators with average phase <2%, average distortion <20%, average force >58% or geophones resistance 332-368 ohms, noise <10 microvolts, leakage >2 megaohms, tilt <5%, and so forth, as examples of some tolerances, some of which are indicated in the associated figures such as FIG. 13 and FIG. 14.

Software controlled instrument tests may be performed by QC personnel using software tests. The software tests may preferably but not necessarily reside in database server 20 to make sure that the software tests are used consistently and are not modified. The resulting instrument test data may then be stored in database server 20. As well, daily contractor data may be utilized and stored in database server 20 where the combination of these different types of data is utilized to produce configurable quantitative quality performance indicators for a seismic signal recording phase of a seismic acquisition operation.

In another embodiment, processing QC (PQC) module 58 may comprise various types of QC procedures for use during the processing phase of the seismic process, which may involve field processing of the seismic signals to verify the quality thereof and/or obtain specific information therefrom.

FIG. 24 discloses a generalized reports generation flow 200 for some of the various possible modules, which in the example of FIG. 24, comprises HSE QC module 52, geodetics QC module 54, acquisition QC module 56, and processing QC module 58. However, additional modules may also utilize this flow or components thereof. In this example, step 202 involves seismic contractor data, as discussed hereinbefore, which is validated at step 204 as to format, value ranges, and/or other checks, whereupon a pass/fail is provided at 206. At step 208, if the contractor data is invalid then an error report is generated so that the seismic contractor can correct the data. To the extent other contractors are utilized, then the generation flow report may be similar.

At steps 210, 212, 214, and 216, daily draft reports may be generated utilizing the seismic contractor data. Utilizing programmable GPS units 38 and/or computers 68, QC personnel of the various disciplines for the different modules may verify contractor data, produce GPS stamped QC scores, add comments, and photos with GPS stamped data as indicated at step 218. The combined data may then be utilized as indicated at steps 220, 222, 224, 226 to produce a draft field supervisor daily report as indicated at 228. Utilizing programmable GPS units 38 and/or computers 68, the field supervisor inputs data as indicated at 230, which then results in a final daily field supervisor report as indicated at 232. This data is then input and stored in database 30 of database server 20 as indicated at 234. This information may then be displayed by the client as indicated at 236 and/or used by the QC field applications as indicted at 238.

Figure 25:
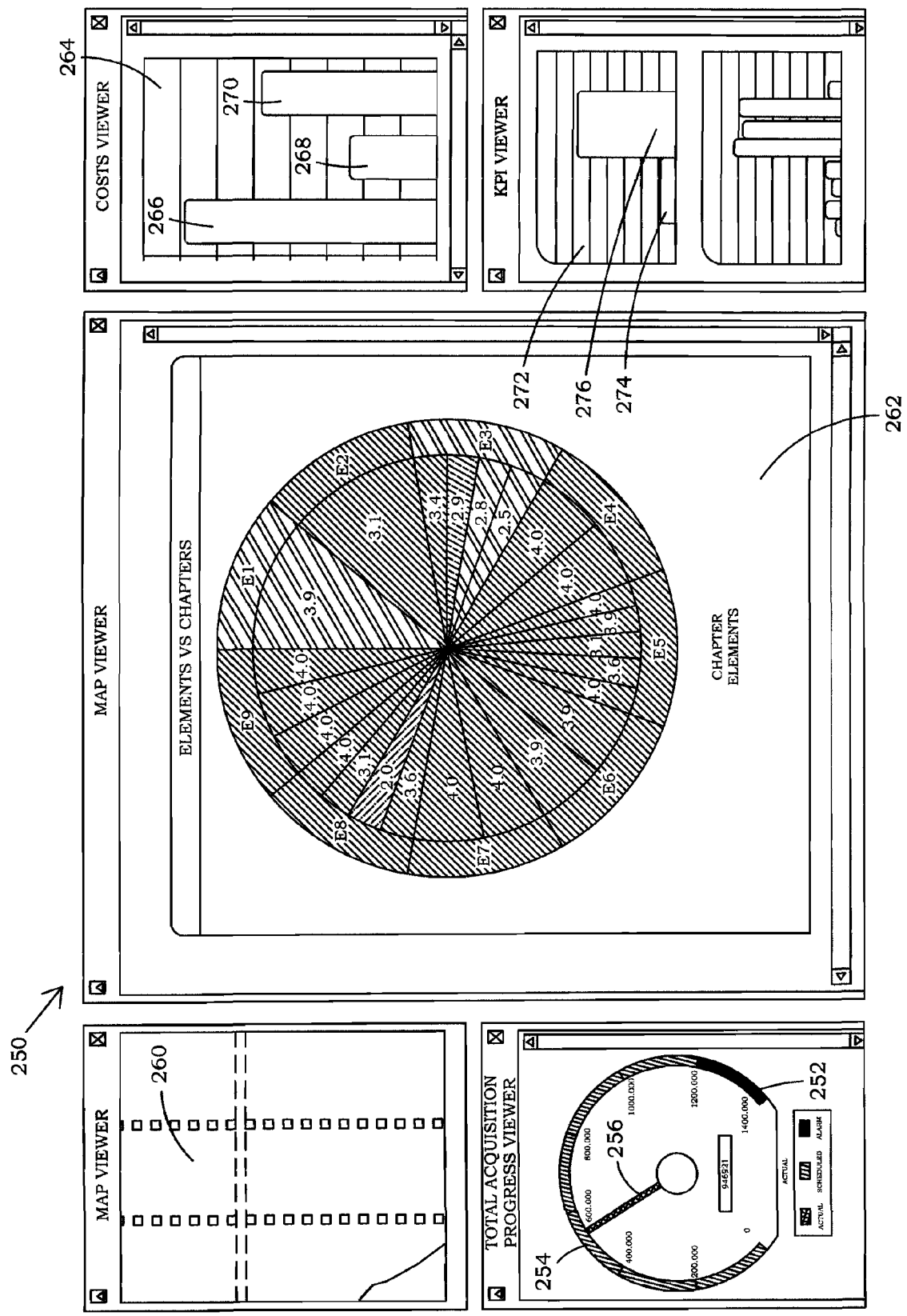
FIG. 25 is a dashboard view that may be utilized by modules of the present invention to quickly portray accumulated daily QC aspects of the seismic project in accord with one possible embodiment of the present invention.

Various types of displays are possible, one of which is shown in FIG. 25. FIG. 25 is discloses dashboard view 250 that may be utilized by modules of the present invention to quickly portray accumulated daily QC aspects of the seismic project in accord with one possible embodiment of the present invention. In the lower left of FIG. 25, the status of various types schedules may be quickly shown as speedometer display 252. In one possible embodiment, speedometer display 252 is a gauge graphic that compares the programmed acquisition quantity versus the actual acquisition quantity up to date. In another example, contract information regarding scheduled costs, as represented by the speedometer scale 254, might be compared by use of speedometer needle 256, which represents actual costs. If the speedometer needle 256 is in red zone 258, then the user will quickly recognize a problem. The same type of speedometer display might be utilized for other accumulative information.

Electronically scalable terrain map 260 may display various aspects, as discussed hereinbefore, such as, for example the daily progress of seismic acquisition, which may be merged into the terrain map.

HSE eye 262 is preferably a color display, in terms of elements versus chapters, and was discussed previously in connection with FIG. 21. HSE eye 262 quickly displays the status of the seismic project from the health, security and environment point of view.

Bar display 264 may be utilized to display aspects such as scheduled items such as source receiver lines, costs, or the like. For example, bar 266 may represent scheduled costs, bar 268 actual costs, and bar 270 may represent remaining costs associated with a seismic project. Bar display 272 is a graphic that shows the evaluation of Key Performance Indicators (KPIs) or quality performance indicators that were configured for the specific seismic project. For example, display 272 may represent a measured KPI 276 versus a goal KPI 274, wherein the user is quickly appraised of discrepancies, which in this example indicate quality problems in a specific part of the seismic project.

In summary, various seismic data merged map displays are possible from a remote location while connecting to database server 20 and/or web server 28. For example, shot lines may be displayed on a terrain map with various types of indicators along the receiver lines as shown in FIG. 6-FIG. 9. The indicators may then be selected to display GPS location indexed digital images of quality problems along the shot lines. The terrain maps may generally comprise satellite views with adjustable detail zoom.

In one embodiment, the health, safety, and environmental (HSE) phase (which actually spans many phases of the seismic operation) is the only module (See FIG. 2) which uses matrix 130. The processor of the database server 28 may be programmed to produce quantitative quality performance indictors in response to the plurality of scores for the rows and columns which form matrix 130.

To maintain oversight by the client in response to the quantitative quality control, the processor can be selectively programmed for a plurality of alarms based on a range of values for the inspection related scores indicators for individual cells of matrix 130 and/or configurable ranges, which can be produced for the rows and columns of matrix 130. The alarms may be sent to selectable lists of personnel, where different personnel are selectable based on the type and severity level of the alarms. Selectable action plans may be created or provided to respond to or avoid alarms.

In summary, to provide more time for QC personnel to make inspections and less time spent on producing reports, the processor can be programmed to automatically generate daily, weekly, and/or monthly reports comprising quantitative quality performance indicators from the modules. For example, first, second, and third sets of quantitative quality performance indicators could be created utilizing three modules.

Other phases of operations may also be covered and other sets of quantitative quality performance indicators may be utilized for those phases. For example, the processor may be programmed for producing quantitative quality performance indicators for a field processing phase of the seismic acquisition operation wherein the seismic data itself may be processed for quality control, which might also be considered part of the acquisition phase. Other phases of the seismic operation are shown and/or discussed in the figures.

As another example, the costs for a seismic operation are relatively difficult to obtain for duplicated points when a per point cost basis is utilized. A cost module may allow a client to follow the costs associated with the seismic contracts on a daily basis which is verified with data from the programmable GPS unit. Convenient displays may be utilized to quickly show the ongoing cost status of a project, such as a speedometer type display that quickly shows where the costs actually are at the present time with an orange hand, where were originally projected to be on the speedometer scale and to provide warnings if they are too high. As a very particular example, marine and land operations may run in parallel in a transition zone along the coast. A quick overview display from a cost analysis module may be utilized for a land, transition zone, and total operation.

The seismic contracts configuration includes multiple types of contracts and multiple milestones (costs) based on attributes such as milestone identifiers and descriptions, unit prices, scheduled number of units to be done during the life of the specific contract. As discussed briefly above, the progress of production is captured by the system on a daily basis and accumulated by invoicing period. As the data is accumulated and analyzed, a pre-invoice report may be generated for all the milestones that had daily production during the invoicing period. Thus, quick oversight graphics can be generated to compare actual costs versus projected costs.

The present invention may also comprise methods which implement the programming discussed above.

Accordingly, the foregoing disclosure and description of the invention is illustrative and explanatory thereof, and it will be appreciated by those skilled in the art, that various changes in the ordering of steps, ranges, and/or attributes and parameters, as well as in the details of the illustrations or combinations of features of the software methods and apparatus discussed herein, may be made without departing from the spirit of the invention.

What is claimed is:

1. A system for quantitative quality control for at least one seismic acquisition operation, said system comprising:
    a programmable GPS unit for use at said at least one seismic acquisition operation, said programmable GPS unit being programmed to produce GPS stamped inspection data, said GPS stamped inspection data comprising scoring input from QC personnel and GPS stamped digital images;
    at least one server programmed for receiving data over an Internet connection, said data comprising at least contractor data comprising contractor daily reports and said GPS stamped inspection data, said at least one server being programmed to populate a matrix of inspection related scores, said at least one server being further programmed to produce a plurality quantitative quality performance indicators related to health, safety, and environment (HSE) in response to said matrix of inspection related scores,
    wherein said at least one server is programmed to produce a segmented display with color coded segments wherein colors indicate ranges of quantitative quality performance for said matrix, and whereby said color coded segments of said display can be selected to display information from said matrix.

2. The system of claim 1, wherein said at least one server is programmed to merge said plurality quantitative quality performance indicators onto an electronically scalable map.

3. The system of claim 1, further comprising:
    said at least one server being programmed to display reforestation data wherein said reforestation data comprises said GPS stamped inspection data from said programmable GPS unit and which further comprises said GPS stamped digital images showing replacement of vegetation, said at least one server being programmed to display indicators at positions of an electronically scalable map wherein said indicators can be selected to view said GPS stamped digital images showing replacement of vegetation to provide quality control evidence of said reforestation.

4. A method for making a system for quantitative quality control for at least one seismic acquisition operation, said method comprising:
    providing a programmable GPS unit for use at said at least one seismic acquisition operation;
    configuring said programmable GPS urdt to produce GPS stamped inspection data, said GPS stamped inspection data comprising scoring input from QC personnel and GPS stamped digital images;
    providing at least one server programmed for receiving data over an Internet connection, said data comprising at least contractor data comprising contractor daily reports and said GPS stamped inspection data; and configuring said at least one server to populate a matrix of inspection related scores, and further programming said at least one server being to produce a plurality quantitative quality performance indicators related to health, safety, and environment (HSE) in response to said matrix of inspection related scores, configuring said at least one server to produce a segmented display with color coded segments wherein colors indicate ranges of quantitative quality performance for said matrix, and whereby said color coded segments of said display can be selected to display information from said matrix.

5. The method of claim 4, configuring said at least one server to merge said plurality of quantitative quality performance indicators onto an electronically scalable map.

6. The method of claim 4, further comprising:

configuring said at least one server to display reforestation data wherein said reforestation data comprises said GPS stamped inspection data from said programmable GPS unit and which further comprises said GPS stamped digital images showing replacement of vegetation, said at least one server being programmed to display indicators at positions of an electronically scalable map wherein said indicators can be selected to view said GPS stamped digital images showing replacement of vegetation to provide quality control evidence of said reforestation.

* * * * *